(12) United States Patent
Mark

(10) Patent No.: US 10,866,808 B2
(45) Date of Patent: Dec. 15, 2020

(54) METHODS AND SYSTEMS TO TRACK KERNEL CALLS USING A DISASSEMBLER

(71) Applicant: Datto, Inc., Norwalk, CT (US)

(72) Inventor: Stuart Mark, Chappaqua, NY (US)

(73) Assignee: DATTO, INC., Norwalk, CT (US)

( * ) Notice: Subject to any disclaimer, the term of this patent is extended or adjusted under 35 U.S.C. 154(b) by 0 days.

(21) Appl. No.: 16/402,949

(22) Filed: May 3, 2019

(65) Prior Publication Data

US 2020/0348938 A1 Nov. 5, 2020

(51) Int. Cl.
*G06F 8/70* (2018.01)
*G06F 9/32* (2018.01)
*G06F 9/48* (2006.01)
*G06F 9/30* (2018.01)
*G06F 3/06* (2006.01)

(52) U.S. Cl.
CPC .............. *G06F 9/322* (2013.01); *G06F 3/065* (2013.01); *G06F 3/0619* (2013.01); *G06F 3/0673* (2013.01); *G06F 9/30058* (2013.01); *G06F 9/4881* (2013.01)

(58) Field of Classification Search
None
See application file for complete search history.

(56) References Cited

U.S. PATENT DOCUMENTS

| 9,594,636 | B2 | 3/2017 | Mortensen et al. |
| 2005/0229250 | A1* | 10/2005 | Ring ................. G06F 21/57 726/23 |
| 2015/0234728 | A1 | 8/2015 | Coleman et al. |
| 2015/0347548 | A1 | 12/2015 | Mortensen et al. |
| 2016/0350169 | A1 | 12/2016 | McChord et al. |
| 2017/0139950 | A1 | 5/2017 | Mortensen et al. |
| 2018/0006870 | A1 | 1/2018 | McChord et al. |
| 2018/0091517 | A1 | 3/2018 | Fury Christ et al. |
| 2018/0101425 | A1 | 4/2018 | McChord et al. |
| 2018/0107824 | A1 | 4/2018 | Gibbons, Jr. et al. |
| 2018/0157535 | A1 | 6/2018 | Dushok |
| 2018/0159929 | A1 | 6/2018 | Heckle |
| 2019/0042373 | A1 | 2/2019 | Mark |

\* cited by examiner

*Primary Examiner* — Cheng Yuan Tseng
(74) *Attorney, Agent, or Firm* — Fay Sharpe LLP

(57) ABSTRACT

This disclosure and the exemplary embodiments described herein, provide methods and systems to trace/verify kernel calls of interest operatively associated with an operating system platform of a device. According to an exemplary embodiment, the mount/unmount kernel call associated with a Linux operating system platform is traced/verified to initiate an incremental backup of a memory of a device during the execution of the mount/unmount kernel call.

22 Claims, 10 Drawing Sheets

METHODS AND SYSTEMS TO TRACK KERNEL CALLS USING A DISASSEMBLER

BACKGROUND

The present disclosure generally addresses the generation, replication and synchronization of disk imaged backups, and more particularly, relates to METHODS AND SYSTEMS TO TRACK KERNEL CALLS USING A DISASSEMBLER. Specifically, this disclosure, and the exemplary embodiments described herein, provide method and systems to perform backups of memory during the execution of a kernel system call of interest, such as but not limited to, a mount/unmount kernel call.

INCORPORATION BY REFERENCE

U.S. Pat. No. 9,594,636, by Mortensen et al., issued Mar. 14, 2017 and entitled "MANAGEMENT OF DATA REPLICATION AND STORAGE APPARATUSES, METHODS AND SYSTEMS";

U.S. Patent Publication No. 2018/0159929, by Philipp Heckle, published Jun. 7, 2018 and entitled "HYBRID CLOUD METHODS, APPARATUS AND SYSTEMS FOR SECURE FILE SHARING AND SYNCHRONIZATION WITH BACKUP AND SERVER VIRTUALIZATION";

U.S. Patent Publication No. 2019/0042373, by Stuart Mark, published Feb. 7, 2019 and entitled "SYSTEMS AND METHODS FOR COPYING AN OPERATING SOURCE VOLUME";

U.S. Patent Publication No. 2018/0157535, by David Dushok, published Jun. 7, 2018 and entitled "METHODS, SYSTEMS AND APPARATUSES FOR MANAGING PRIORITIZATION OF TIME-BASED PROCESSES";

U.S. Patent Publication No. 2018/0107824, by Gibbons, Jr. et al., Published Apr. 19, 2018 and entitled "SYSTEMS AND METHODS FOR DETECTING RANSOMWARE INFECTION";

U.S. Patent Publication No. 2018/0101425, by McChord et al., published Apr. 12, 2018 and entitled "APPARATUSES, METHODS AND SYSTEMS FOR DETERMINING A VIRTUAL MACHINE STATE";

U.S. Patent Publication No. 2018/0091517, by Fury Christ et al., published Mar. 29, 2018 and entitled "NETWORK ATTACHED STORAGE (NAS) APPARATUS HAVING REVERSIBLE PRIVACY SETTINGS FOR LOGICAL STORAGE AREA SHARES, AND METHODS OF CONFIGURING SAME";

U.S. Patent Publication No. 2018/0006870, by McChord et al., published Jan. 4, 2018 and entitled "REMOTELY CONFIGURABLE ROUTERS WITH FAILOVER FEATURES, AND METHOD AND APPARATUS FOR RELIABLE WEB-BASED ADMINISTRATION OF SAME";

U.S. Patent Publication No. 2017/0139950, by Mortensen et al., published May 18, 2017 and entitled "MANAGEMENT OF DATA REPLICATION AND STORAGE APPARATUSES, METHODS AND SYSTEMS";

U.S. Patent Publication No. 2016/0350169, by McChord et al., published Dec. 1, 2016 and entitled "APPARATUSES, METHODS AND SYSTEMS FOR DETERMINING A VIRTUAL MACHINE STATE";

U.S. Patent Publication No. 2015/0347548, by Mortensen et al., published Dec. 3, 2015 and entitled "MANAGEMENT OF DATA REPLICATION AND STORAGE APPARATUSES, METHODS AND SYSTEMS"; and U.S. Patent Publication No. 2015/0234728, by Coleman et al., published Aug. 20, 2015 and entitled "CPU REGISTER ASSISTED VIRTUAL MACHINE SCREENSHOT CAPTURE TIMING APPARATUSES, METHODS AND SYSTEMS", are incorporated herein by reference in their entirety.

BRIEF DESCRIPTION

In one embodiment of this disclosure, described is a processor implemented method for tracing a kernel call of interest associated with an operating system platform of a device, the method comprising: determining a memory location of a kernel system call table within a kernel memory space of the device, the kernel system call table including a plurality of kernel call entries, each kernel call entry including a pointer to a memory address of an opcode and associated operand within the kernel memory space; determining a memory location of a kernel call of interest entry within the memory location of the kernel system call table, and extracting a pointer associated with the kernel call of interest entry within the memory location of the kernel system call table; performing a disassembler search process to validate the kernel call of interest entry points to an opcode and associated operand which transfers control of execution of the kernel call of interest to a memory address identical to a target memory address associated with the kernel call of interest included in a kernel system call map table, the kernel system call map including a plurality of kernel calls mapped to a plurality of respective target memory addresses within the kernel memory space, and the disassembler search process setting a kernel call entry condition as valid if the kernel call of interest entry points to an opcode and associated operand which transfers control of execution of the kernel call of interest to the target memory address associated with the kernel call of interest included in the kernel system call map table.

In another embodiment of this disclosure, described is a processor implemented method for creating a backup of a memory operatively associated with a device during an execution of a kernel call of interest associated with an operating system platform of the device, the kernel call of interest including one of a mount kernel call and an unmount kernel call, the device including a backup agent operatively associated with the operating system platform, and the backup agent operatively associated with a backup system to store backups of the memory operatively associated with the device during the execution of the kernel call of interest, the method comprising: a modified kernel system call table including a pointer which redirects the kernel call of interest, prior to execution by the operating system platform; and a kernel module executing the kernel call of interest by the operating system platform by calling a memory address associated with an original kernel system call table entry associated with the kernel call of interest, wherein the modified kernel system call table is generated by a kernel module function modifying the original kernel system call table if a kernel call verification process sets a kernel call entry condition as valid, the kernel call verification process including a disassembler search process configured to validate the original kernel system call table entry associated with the kernel call of interest points to an opcode and associated operand which transfers control of execution of the kernel call of interest to a memory address identical to a target memory address associated with the kernel call of interest included in a kernel system call map table, the kernel system call map including a plurality of kernel calls mapped to a plurality of respective target memory addresses within the kernel memory space, and the disassembler search process setting the kernel call entry condition as valid if the kernel call of interest entry points to an opcode and associated operand which transfers control of execution of the kernel call of interest to the target memory address associated with the kernel call of interest included in the kernel system call map table.

In still another embodiment of this disclosure, described is a backup system for managing the replication and storage of data sets comprising: a memory storing computer executed instructions; and one or more processors operatively associated with the memory, the one or more processors configured to implement a host of a first file system, the one or more processors being further configured to execute the instructions to: execute a backup of a state and content of a computer device operatively associated with the memory and the one or more processors according to a backup and snapshot schedule, the backup generating image enabled backup data reflecting the state and content of the computer device, the backup capturing a snapshot of the image enabled backup date, and the backup storing the snapshot in the first file system; synchronize the first file system to a mirrored second file system; execute a kernel call of interest including one of a mount kernel call and an unmount kernel call prompted by a modified kernel system call table operatively associated with an operating system platform of the computer device, the modified kernel system call table including a pointer which redirects the kernel call of interest, prior to execution by the operating system platform, to a backup agent to perform a backup of the memory during execution of the kernel call of interest; and a kernel module directing an execution of the kernel call of interest by the operating system platform by calling a memory address associated with an original kernel system call table entry associated with the kernel call of interest, wherein the modified kernel system call table is generated by a kernel module function modifying the original kernel system call table if a kernel call verification process sets a kernel call entry condition as valid, the kernel call verification process including a disassembler search process configured to validate the original kernel system call table entry associated with the kernel call of interest points to an opcode and associated operand which transfers control of execution of the kernel call of interest to a memory address identical to a target memory address associated with the kernel call of interest included in a kernel system call map table, the kernel system call map including a plurality of kernel calls mapped to a plurality of respective target memory addresses within the kernel memory space, and the disassembler search process setting the kernel call entry condition as valid if the kernel call of interest entry points to an opcode and associated operand which transfers control of execution of the kernel call of interest to the target memory address associated with the kernel call of interest included in the kernel system call map table.

In yet another embodiment of this disclosure, described is a backup agent for persisting an incremental backup of a memory operatively associated with a device during an execution of a kernel call of interest including one of a mount kernel call and an unmount kernel call associated with an operating system platform of the device, the backup agent configured to perform an incremental backup method comprising: determining a memory location of an original kernel system call table within a kernel memory space of the device, the original kernel system call table including a plurality of kernel call entries, each kernel call entry including a pointer to memory address of an opcode and associated operand within the kernel memory space; determining a memory location of the kernel call of interest within the memory location of the original kernel system call table, and extracting a pointer associated with the kernel call of interest entry within the memory location of the original kernel system call table; performing a disassembler search process to validate the kernel call of interest entry points to an opcode and associated operand which transfers control of execution of the kernel call of interest to a memory address identical to a target memory address associated with the kernel call of interest included in a kernel system call map table, the kernel system call map including a plurality of kernel calls mapped to a plurality of respective target memory addresses within the kernel memory space, and the disassembler search process setting a kernel call entry condition as valid if the kernel call of interest entry points to an opcode and associated operand which transfers control of execution of the kernel call of interest to the target memory address associated with the kernel call of interest included in the kernel system call map table a modified kernel system call table operatively associated with the operating system platform of the device directing the execution of the kernel call of interest, the modified kernel system call table redirecting the kernel call of interest, prior to execution by the operating system platform, to a kernel module; and the kernel module directing the execution of the kernel call of interest by the operating system platform by calling a memory address associated with an original kernel system call table entry associated with the kernel call of interest, wherein the modified kernel system call table is generated by a kernel module function modifying the original kernel system call table if a kernel call verification process, including the disassembler search process, sets the kernel call entry condition as valid.

DETAILED DESCRIPTION

Figure 1A:
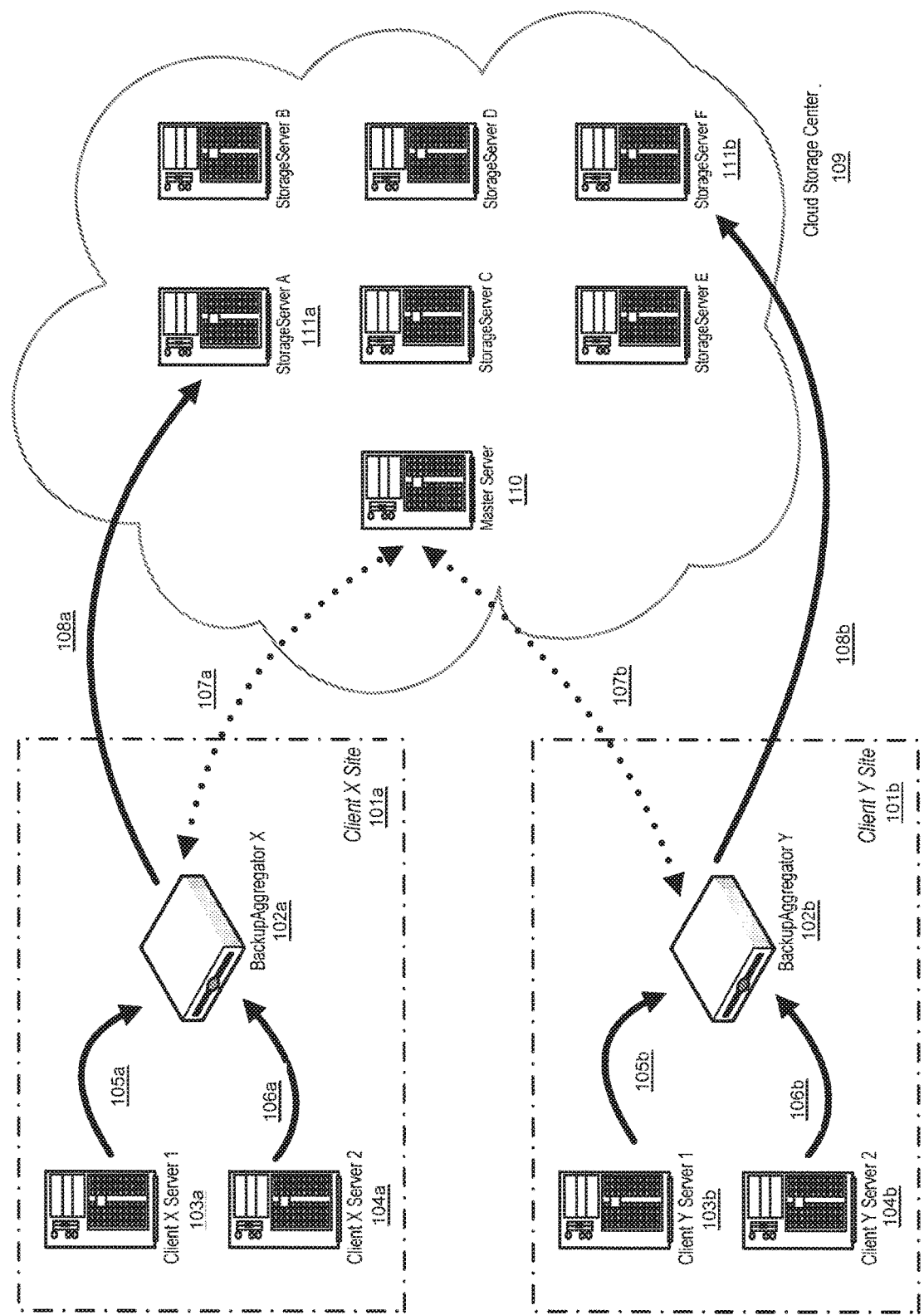
FIG. 1A shows a block diagram of a backup network system including a local Backup Aggregator according to an exemplary embodiment of this disclosure.

Many industries are changing the way they handle and protect data in response to compliance regulations, migration to electronic data, emerging data management strategies, and end-user demands. For example, a loss of financial records can easily result in large monetary losses and can subject businesses to government fines. Other examples are healthcare, and legal institutions that are also required to comply with data integrity government regulations which could potentially lead to severe noncompliance consequences. In addition, small businesses are generating more electronic data than ever and the value of that data is increasing. Simultaneously, there are more risks of losing data. Thus, backing up data in a reliable way may be desired by industries, small business and organizations alike.

Logical volumes can be written to by one or more operating systems. These logical volumes can also be copied for multiple purposes, such as for backup of critical data or applications, or to make the contents of the source logical volume available at another time or location.

One way to create a copy of a source logical volume that is crash-consistent is to suspend all writes to the source volume while the copying process is ongoing. This can be achieved by instructing an operating system managing the source logical volume to stop writing to the source volume while the source volume is being copied to a target volume. However, for large logical volumes, this can impose an undesirable burden on performance since the time required to copy the source volume may be lengthy. For instance, the copying procedure may take hours, during which the source volume may be unable to accept new write requests.

Another way to create a copy of a source logical volume that is crash consistent is to cause the operating system managing the source volume to enter a copy-on-write mode before the copying process starts, and to remain in the copy-on-write mode until the source volume is completely copied to the target volume. A source volume can be considered to comprise multiple "blocks" of storage, wherein each block stores a certain amount of data. When in copy-on-write mode, the operating system intercepts every write instruction to the source volume before the write occurs. The operating system then determines, for every write, whether the write would (if allowed to proceed) modify a block of the source volume that has not yet been copied to the target volume. If the to-be-modified block has already been copied to the target volume, the operating system can allow the write to proceed. If the to-be-modified block has not yet been copied, the operating system can copy the original, un-modified contents of the to-be-modified block to a "copy-on-write file" or "CoW file", thereby preserving the original state of the to-be-modified block. After the original contents of the to-be-modified block have been safely copied to the CoW file, the operating system can allow the write instruction to modify the block.

At a later time, when the process copying the source volume to the target volume attempts to copy the modified block, the copying process can be re-directed to copy from the portion of the CoW file that stores the original contents of the modified block. In this way, the copy of the source volume that is copied to the target volume remains crash consistent because it reflects the state of the source volume at the instant the operating system entered copy-on-write mode (i.e., at the beginning of the copy process). A copy of a source logical volume that is crash consistent is typically associated with a time designation, where the time designation refers to a time that the copy process commenced, at which time the copy is crash consistent.

However, causing the operating system to enter a copy-on-write mode can also impact the performance and responsiveness of the operating system and the source volume. Requiring the operating system to examine every write instruction to the source volume, and potentially copy blocks of the source volume to the CoW file, can tie up scarce computational resources needed for other operating system processes. Furthermore, copy-on-write mode can decrease the perceived speed with which the source volume responds to write instructions. If the copying process takes a long time, and if the operating system makes many writes to the source volume during the copying process, a large amount of storage may need to be reserved for the CoW file to store the large number of blocks that are modified. In some systems, this storage for the CoW file must be reserved in advance, even though the operating system cannot predict exactly how long the copying process will take, or how many writes will need to be made to the source volume during the copying process. If the storage reserved for the CoW file is too small to hold all the blocks that were modified during the copying process, the entire copying process may fail. In these cases, the copying process may need to be re-started from the beginning. If the storage reserved for the CoW file is too large, less memory storage space is available for other data and/or applications.

To maintain the optimal performance and responsiveness of an operating system, a backup system, as disclosed in U.S. Pat. No. 9,594,636, by Mortensen et al., issued Mar. 14, 2017 and entitled "MANAGEMENT OF DATA REPLICATION AND STORAGE APPARATUSES, METHODS AND SYSTEMS", can be used to perform scheduled backups of logical volumes, without executing a copy-on-write mode. In addition, a system and method of copying source volumes to target volumes during a copy-on-write mode, as disclosed in U.S. Patent Publication No. 2019/0042373, by Stuart Mark, published Feb. 7, 2019 and entitled "SYSTEMS AND METHODS FOR COPYING AN OPERATING SOURCE VOLUME", can decrease the performance burden on the operating system, while also decreasing the amount of memory required for the copying process.

Regardless of whether a backup system executes scheduled backups and/or copy-on-write backup, there is also a necessity to perform backups of logical volumes associated with the execution of a mount and unmount kernel system call or potentially other file system logical volume attachment commands. A mount kernel call is a process performed by an operating system to make files and directories on a storage device, such as a hard drive or virtual drive, available for users to access. An unmount kernel call is a process performed by an operating system to terminate user access to the files and directories on a storage device. In addition to user-initiated mount/unmount calls being performed to mount or unmount a drive, the bootup process or shutdown process of a computer device will execute mount/unmount kernel functions, respectively, to mount one or more logical drives during a backup processes or unmount one or more logical drives during a shutdown process.

To enable a complete backup of a logical drive during the execution of a mount/unmount process or other file system logical volume attachment process, the backup system may, prior to execution of the mount/unmount kernel system call, enter a copy-on-write mode, regardless of any decrease in performance of the operating system, to insure any write to a logical drive of interest is copied and stored for use as a backup. Alternatively, or in addition, the backup system may perform an image-based incremental backup, full backup and/or a differential backup of the logical drive.

This disclosure, and the exemplary embodiments described herein, are related to the backup, replication, storage and recovery of memory associated with a device, such as, but not limited to, a complete hard disk, partial hard disk volume, complete virtual disk, partial virtual disk volume, solid state storage device, magnetic tape storage, other nonvolatile and volatile data media, and one or more files, which are operatively associated with one or more of a PC (Personal Computer), workstation, server, mobile computing device, cell phone, web appliance, network router, switch, bridge, tablet PC, set-top box (STB) and personal digital assistant (PDA). More specifically, this disclosure, and the exemplary embodiments described herein, provide methods and systems to trace and verify a kernel system call of interest associated with an operating system platform of a device in order to redirect the kernel system call of interest to a kernel module to initiate the execution of other processes either before or during the execution of the kernel call of interest by the operating system platform kernel. After the execution of these other processes by the kernel module, the kernel module initiates the execution of the kernel system call of interest by directing the operating system to perform the kernel system call of interest originally redirected or intercepted.

The detailed description and exemplary embodiments herein, describe kernel call tracing/verification methods and systems which use a disassembler process to trace/verify a kernel mount/unmount function address associated with a kernel system call table is identical to a kernel system call map table address associated with a Linux operating system of a device. If the tracing and verification of the mount/unmount call yields identical memory addresses, a modified kernel system call table redirects any mount/unmount kernel calls initiated by a user to a kernel module to, for example, track an associated drive and initiate backup of the drive associated with the mount/unmount call. Then the kernel module points back to the memory address of the mount/unmount function associated with the original kernel system call table to perform the mount/unmount call function. While this disclosure specifically focuses on mount/unmount kernel calls, the use of kernel call tracing/verification methods and systems, as described herein, is applicable to tracing/verifying other kernel calls of interest which are included in an operating system platform kernel system call table and kernel system call table map, for example, a file system logical volume attachment process.

By tracking kernel call mounts/unmounts, a backup system has the ability to persist backups of a device's memory, the backup process including any one or more of an incremental backup, a full backup or differential backup and a differential backup through a reboot. Specifically, by tracking kernel call mounts/unmounts, a backup system has the ability to persist incremental backups through a reboot of the device. This means if a device or machine is rebooted, the next backup can be an incremental rather than a full backup or differential, a full backup or differential being much more resource intensive than an incremental backup.

In the case of a Linux Operating System (OS) platform, the Linux development community has made changes such that there is currently a distinction between kernels calls and user-space calls for mount/unmount kernel calls, which has led to uncertainty in identifying kernel calls for a mount/unmount function in the system call table. Therefore, any backup process of a device which is initiated or prompted by a mount/unmount kernel call and redirects the mount/unmount kernel call to track an associated volume needs to validate a called mount/unmount kernel call is associated with an expected kernel space memory location for subsequent calling and execution of the mount/unmount kernel call by the backup process.

Linux user-space programs can call kernel functions via the system call interface, where the user-space program provides a number, for example, 165 for mount and 166 for unmount, and the user-space program instructs the kernel to run the function, and the kernel itself, as well as dynamically loaded modules such as a backup kernel module associated with a backup process, can also call kernel functions. In the case of kernel executed call functions and kernel module call functions, they are in the kernel memory space, so they are not required to go through the system call interface procedure and they are called directly (with exceptions). In other words, in a Linux OS both user-space programs and parts of the kernel as well as dynamically loaded modules, can call kernel functions, but the user-space has to go through an extra step to do it.

According to an exemplary embodiment, the address corresponding to a target address is identified by the disassembler identifying a particular call, jump or branch statement and the disassembler locates a target address, where the target address used by the disassembler is an absolute address.

A kernel system call table is an Application Programming Interface (API) for the interface between user-space and kernel space. Below is a partial section of an example Linux system call table (see Table 1).

TABLE 1

| # | Name | eax | ebx | ecx | edx | esi | edi | Definition |
|---|------|-----|-----|-----|-----|-----|-----|------------|
| | | | | Registers | | | | |
| 0 | sys_restart_syscall | 0x00 | — | — | — | — | — | kernel/signal.c:2058 |
| 1 | sys_exit | 0x01 | int error_code | — | — | — | — | kernel/exit.c:1046 |
| 2 | sys_fork | 0x02 | struct pt_regs * | — | — | — | — | arch/alpha/kernel/entry.S:716 |
| 3 | sys_read | 0x03 | unsigned int fd | char __user *buf | size_t count | — | — | fs/read_write.c:391 |
| 4 | sys_write | 0x04 | unsigned int fd | const char __user *buf | size_t count | — | — | fs/read_write.c:408 |
| 5 | sys_open | 0x05 | const char __user *filename | int flags | int mode | — | — | fs/open.c:900 |

TABLE 1-continued

| # | Name | eax | ebx | ecx | edx | esi | edi | Definition |
|---|---|---|---|---|---|---|---|---|
| 6 | sys_close | 0x06 | unsigned int fd | — | — | — | — | fs/open.c:969 |
| 7 | sys_waitpid | 0x07 | pid_t pid | int __user *stat_addr | int options | — | — | kernel/exit.c:1771 |
| 8 | sys_creat | 0x08 | const char __user *pathname | int mode | — | — | — | fs/open.c:933 |
| 9 | sys_link | 0x09 | const char __user *oldname | const char __user *newname | — | — | — | fs/namei.c:2520 |
| 10 | sys_unlink | 0x0a | const char __user *pathname | — | — | — | — | fs/namei.c:2352 |
| 11 | sys_execve | 0x0b | char __user * | char __user *__user * | char __user *__user * | struct pt_regs * | — | arch/alpha/kernel/entry.S:925 |
| 12 | sys_chdir | 0x0c | const char __user *filename | — | — | — | — | fs/open.c:361 |
| 13 | sys_time | 0x0d | time_t __user *tloc | — | — | — | — | kernel/posix-timers.c:855 |
| 14 | sys_mknod | 0x0e | const char __user *filename | int mode | unsigned dev | — | — | fs/namei.c:2067 |
| 15 | sys_chmod | 0x0f | const char __user *filename | mode_t mode | — | — | — | fs/open.c:507 |
| 16 | sys_lchown16 | 0x10 | const char __user *filename | old_uid_t user | old_gid_t group | — | — | kernel/uid16.c:27 |
| 17 | not implemented | 0x11 | — | — | — | — | — | |
| 18 | sys_stat | 0x12 | char __user *filename | struct __old_kernel_stat __user *statbuf | — | — | — | fs/stat.c:150 |
| 19 | sys_lseek | 0x13 | unsigned int fd | off_t offset | unsigned int origin | — | — | fs/read_write.c:167 |
| 20 | sys_getpid | 0x14 | — | — | — | — | — | kernel/timer.c:1337 |
| 21 | sys_mount | 0x15 | char __user *dev_name | char __user *dir_name | char __user *type | unsigned long flags | void __user *data | fs/namespace.c:2118 |
| 22 | sys_oldumount | 0x16 | char __user *name | — | — | — | — | fs/namespace.c:1171 |
| 23 | sys_setuid16 | 0x17 | old_uid_t uid | — | — | — | — | kernel/uid16.c:67 |
| 24 | sys_getuid16 | 0x18 | — | — | — | — | — | kernel/uid16.c:212 |
| 25 | sys_stime | 0x19 | time_t __user *tptr | — | — | — | — | kernel/time.c:81 |
| 26 | sys_ptrace | 0x1a | long request | long pid | long addr | long data | — | kernel/ptrace.c:688 |
| 27 | sys_alarm | 0x1b | unsigned int seconds | — | — | — | — | kernel/timer.c:1314 |
| 28 | sys_fstat | 0x1c | unsigned int fd | struct __old_kernel_stat __user *statbuf | — | — | — | fs/stat.c:174 |
| 29 | sys_pause | 0x1d | — | — | — | — | — | kernel/signal.c:2700 |
| 30 | sys_utime | 0x1e | char __user *filename | struct utimbuf __user *times | — | — | — | fs/utimes.c:27 |
| 31 | not implemented | 0x1f | — | — | — | — | — | |
| 32 | not implemented | 0x20 | — | — | — | — | — | |
| 33 | sys_access | 0x21 | const char __user *filename | int mode | — | — | — | fs/open.c:356 |
| 34 | sys_nice | 0x22 | int increment | — | — | — | — | kernel/sched.c:4282 |
| 35 | not implemented | 0x23 | — | — | — | — | — | |
| 36 | sys_sync | 0x24 | — | — | — | — | — | fs/sync.c:98 |
| 37 | sys_kill | 0x25 | int pid | int sig | — | — | — | kernel/signal.c:2317 |
| 38 | sys_rename | 0x26 | const char __user *oldname | const char __user *newname | — | — | — | fs/namei.c:2765 |
| 39 | sys_mkdir | 0x27 | const char __user *pathname | int mode | — | — | — | fs/namei.c:2130 |

TABLE 1-continued

|   |   |     | Registers |     |     |     |     |   |
|---|---|-----|-----------|-----|-----|-----|-----|---|
| # | Name | eax | ebx | ecx | edx | esi | edi | Definition |
| 40 | sys_rmdir | 0x28 | const char __user *pathname | — | — | — | — | fs/namei.c:2244 |
| 41 | sys_dup | 0x29 | unsigned int fildes | — | — | — | — | fs/fcntl.c:131 |
| 42 | sys_pipe | 0x2a | int __user *fildes | — | — | — | — | fs/pipe.c:1117 |
| 43 | sys_times | 0x2b | struct tms __user *tbuf | — | — | — | — | kernel/sys.c:896 |
| 44 | not implemented | 0x2c | — | — | — | — | — | |
| 45 | sys_brk | 0x2d | unsigned long brk | — | — | — | — | mm/mmap.c:245 |
| 46 | sys_setgid16 | 0x2e | old_gid_t gid | — | — | — | — | kernel/uid16.c:51 |
| 47 | sys_getgid16 | 0x2f | — | — | — | — | — | kernel/uidl6.c:222 |
| 48 | sys_signal | 0x30 | int sig | __sighandler_t handler | — | — | — | kernel/signal.c:2683 |
| 49 | sys_geteuid16 | 0x31 | — | — | — | — | — | kernel/uid16.c:217 |
| 50 | sys_getegid16 | 0x32 | — | — | — | — | — | kernel/uid16.c:227 |
| 51 | sys_acct | 0x33 | const char __user *name | — | — | — | — | kernel/acct.c:274 |
| 52 | sys_umount | 0x34 | char __user *name | int flags | — | — | — | fs/namespace.c:1132 |
| 53 | not implemented | 0x35 | — | — | — | — | — | |
| 54 | sys_ioctl | 0x36 | unsigned int fd | unsigned int cmd | unsigned long arg | — | — | fs/ioctl.c:613 |
| 55 | sys_fcntl | 0x37 | unsigned int fd | unsigned int cmd | unsigned long arg | — | — | fs/fcntl.c:429 |
| 56 | not implemented | 0x38 | — | — | — | — | — | |
| 57 | sys_setpgid | 0x39 | pid_t pid | pid_t pgid | — | — | — | kernel/sys.c:921 |
| 58 | not implemented | 0x3a | — | — | — | — | — | |
| 59 | sys_olduname | 0x3b | struct oldold_utsname __user * | — | — | — | — | kernel/sys.c:1132 |
| 60 | sys_umask | 0x3c | int mask | — | — | — | — | kernel/sys.c:1460 |
| 61 | sys_chroot | 0x3d | const char __user *filename | — | — | — | — | fs/open.c:408 |
| 62 | sys_ustat | 0x3e | unsigned dev | struct ustat __user *ubuf | — | — | — | fs/statfs.c:175 |
| 63 | sys_dup2 | 0x3f | unsigned int oldfd | unsigned int newfd | — | — | — | fs/fcntl.c:116 |
| 64 | sys_getppid | 0x40 | — | — | — | — | — | kernel/timer.c:1348 |
| 65 | sys_getpgrp | 0x41 | — | — | — | — | — | kernel/sys.c:1020 |

To further illustrate, each Linux OS distribution company determines their selection of settings and options and things to build into their kernel. They build their kernel and they distribute that binary result to everybody who installs their kernel. Since each build of the kernel with different settings will yield a different kernel binary, the memory locations for each function within the kernel after it is loaded into memory are different from build to build, and a system.map file is distributed with that specific kernel build with all of its particular settings so that the addresses in the system.map file refer to the actual location of that symbol/function in the kernel when it is loaded into memory.

A system.map file is a text file with a map of the globally exported symbols to its address in the kernel as it was built. Below is a listing of a partial section of an example system.map file.

```
ffffffff81238130 t graft_tree
ffffffff812381c0 t do_add_mount
ffffffff81238290 T finish_automount
ffffffff81238390 T copy_mount_options
ffffffff812385b0 T copy_mount_string
ffffffff812385d0 T do_mount
ffffffff81239360 T copy_mnt_ns
ffffffff81239600 T SyS_mount
ffffffff81239600 T sys_mount
ffffffff81239700 T is_path_reachable
ffffffff81239760 T path_is_under
ffffffff812397b0 T SyS_pivot_root
ffffffff812397b0 T sys_pivot_root
ffffffff81239b60 T put_mnt_ns
ffffffff81239b90 T mount_subtree
ffffffff81239c60 t mntns_install
```

So, when a machine boots with this kernel, the sys_mount function is located at address ffffffff81239600 in memory.

The disassembler process disclosed herein checks if the system call entry actually points to the function of interest.

According to an exemplary embodiment of this disclosure, a disassembler process checks if a kernel system call entry actually points to the appropriate kernel function of interest by performing a method for establishing and employing a trace mechanism for tracing a call to a kernel function of interest using the disassembler process, including:

A) Selecting a kernel function of interest having an associated system function entry (e.g., sys_mount, sys_unmount);

B) Locating the system call table within kernel memory space;

C) Locating within the system call table, a candidate associated system function entry for the kernel function of interest;

D) Extracting the absolute address of the candidate associated system function entry for the kernel function of interest from the system call table;

E) Validating that the candidate associated system function entry is the associated system function entry of the kernel function of interest, where the validation is performed by a disassembler search procedure;

F) the disassembler Identifying an address corresponding to a target address within a system call map table which contains systems calls and associated addresses;

G) Setting the kernel function entry validation to true if the disassembler search procedure validates that the candidate associated system function entry is the associated system function entry of the kernel function of interest; and H) Determining an affirmative tracing of a call to the kernel function of interest when the kernel function of interest, having the associated system function entry, is called and the kernel function entry validation is set to true.

According to an exemplary embodiment, the address corresponding to a target address is identified by the disassembler identifying a particular call, jump or branch statements and the disassembler locating a putative target address.

It is to be understood that the disclosed method and system for tracing a kernel call of interest includes the modification of a kernel system call table to redirect or intercept any user kernel system calls. More specifically, the disclosed exemplary embodiments include a modification of a kernel system call table to redirect or intercept kernel system calls related to file system logical volume attachment commands, such as but not limited to, mount/unmount kernel system calls. It is also to be understood that the disassembler process disclosed fundamentally determines the flow of execution of a kernel call of interest associated with an original kernel system call table and validates the determined flow of execution of the kernel call of interest is consistent with the kernel system map table. This disassembler validation process provides an assurance that modification of the original kernel system call table to redirect the user called kernel call of interest to another process, such as a backup, volume tracking or other process which subsequently directs the OS to the original kernel space to execute the kernel call of interest, will not harm the operation of the device running the OS.

Provided below is a detailed description of a backup network system (FIGS. 1A and 1B) with and without a local backup aggregator, respectively, a method of performing backups of one or more client devices including scheduled backups (FIG. 2) as well as kernel call initiated/prompted backups including a disassembler process to trace/validate kernel calls (FIGS. 3-7), and hardware platforms (FIGS. 8 and 9) to perform the backup processes and kernel trace/validation processes disclosed herein.

While the descriptions of FIGS. 1A, 1B, 2, 8 and 9 that follow include the details of a specific backup network system and associated hardware platform, U.S. Pat. No. 9,594,636, by Mortensen et al., issued Mar. 14, 2017 and entitled "MANAGEMENT OF DATA REPLICATION AND STORAGE APPARATUSES, METHODS AND SYSTEMS" and U.S. Patent Publication No. 2019/0042373, by Stuart Mark, published Feb. 7, 2019 and entitled "SYSTEMS AND METHODS FOR COPYING AN OPERATING SOURCE VOLUME" disclose other details and variants of a backup network system that can include a kernel call tracing and verification process including a disassembler process, as described herein, to provide an exemplary complete backup system.

With reference to FIG. 1A, shown is a block diagram of a backup network system including a local Backup Aggregator according to an exemplary embodiment of this disclosure.

The system generally provides for data replication and storage in a replication network, via BDR components, in response to user inputs and/or scheduled backups.

According to an exemplary embodiment, the Backup Disaster Recovery "BDR" monitors block level changes as they occur on a plurality of physical or virtual hard disks performing block-based backups and storing substantially ready-to-run disk images (e.g., VMDK, VHDX, VDI and/or the like formats) corresponding to the latest and/or multiple previous restore points of a hard disk life span. In some embodiments, the previous restore points may be represented as snapshots stored in a file system capable of snapshotting (such as, for example, ZFS). In one embodiment, a ready-to-run disk image as described herein is a file stored in a format that is ready to be booted, mounted and/or exported to a virtual host. In another embodiment, a ready-to-run disk image may be pre-appended with a header to be booted or mounted in a virtual host. Having ready-to-run images allows the BDR system to facilitate effective failover strategies such as instant on-site and off-site virtualization. In another embodiment, the BDR system relies on its ability to take block-based snapshots capable to contain information for an entire file system occupying significantly less memory space than full size images. Because the BDR applies incremental ascend images upon receipt and integrates them into a file system there is no need to store a series of previous incremental backups once applied. In still another embodiment, the BDR system comprises a management engine regulating in real time the offsite transfer and replication of backup files. Yet in another embodiment, the memory space preservation provided by the BDR's backup technology and the BDR's backup management engine allows the generation and transfer of backup files at a high rate, mapping an extensive number of points-in-time of a hard disk without rapidly reaching storage space or bandwidth constraints.

The BDR components provide complete and swift recovery of data corresponding to multiple restore points but unlike conventional image-based backup and recovery systems the BDR does not require the bandwidth to either transfer full size disk images to and from the cloud or transfer backup files to the cloud for each of the restore points that a client may want to maintain. For example, the BDR may implement a policy to backup a client's device to a local storage node on an hourly basis providing the client's device with multiple one hour apart restore points. The BDR may also convert or merge two or more hourly backup files into a single backup representation containing the changes made to the client's device during the lapse of the selected hours and send it to a cloud-based storage system. Therefore, the client's device may be able to rollback to restore points generated on hourly basis or restore points separated by a certain number of hours apart chosen by the user. Moreover, the restore points may be expunged from the BDR system based on memory space preservation policies that may be configured by the client defining a number of hours', days', months' or years' worth of data the client may want to maintain.

According to an exemplary embodiment, the BDR leverages a file system capable of snapshotting contents in a manner that allows for the efficient storage of the most recent substantially ready-to-run disk image (e.g., the last mock-level image-based backup). However, previous versions of the substantially ready-to-run disk image may be represented in the file system of the BDR server holding the substantially ready-to-run disk image (or another server in communication with the BDR). In such a configuration, the BDR may avoid the requirement to retain multiple files representing incremental changes to the physical or virtual hard disk being backed up (e.g., the hard drive represented by the substantially ready-to-run disk image). Upon receipt of a new substantially ready-to-run disk image, the BDR may overwrite the currently stored version of the substantially ready-to-run disk image. The BDR may thereafter perform a local file system snapshot such that the differential between the previous and current substantially ready-to-run disk image is tracked by the file system itself. This BDR feature provides at least the feature of allowing the BDR to maintain the currently active substantially ready-to-run disk image in a state that represents the last backup. Advantageously, in a disaster event, the BDR does not need to incrementally build or create a substantially ready-to-run disk image because it is already created and stored by the BDR as described above. In cases where the BDR is called upon to provide a substantially ready-to-run disk image of an image at a previous point in time, the BDR may execute a file system command to make a previous snapshot of the current substantially ready-to-run disk image available for instantiation. Based on the manner in which some snapshot capable file systems operate, the time to instantiation of the previous snapshot may be substantially faster than a procedure whereby multiple incremental changes are applied to a base backup or image to determine or create the needed substantially ready-to-run disk image. Furthermore, the above BDR configuration may provide substantial overhead savings in the potentially more common case wherein the most recent substantially ready-to-run disk image is the disk image to be instantiated (e.g., taking advantage of the fact that in most disaster recover situations the most recent backup is the desired backup).

According to an exemplary embodiment, the BDR may be configured to initiate an underlying snapshot capable file system command to merge two or more file system maintained snapshots into a single snapshot representation. For example, in one configuration the BDR may generate hourly snapshots of the substantially ready-to-run disk image (such a schedule corresponding to, but lagging, the BDR's receipt of an updated substantially ready-to-run disk image). After a period of one week, the oldest hourly snapshots may be merged by the underlying snapshot capable file system at the direction of the BDR. By utilizing the underlying file system's representation of the substantially ready-to-run disk image at various points in time—as opposed to, for example, incremental files representing each hour of changes—the BDR may take advantage of efficiencies in merging incremental snapshots that are not available in other backup systems. For example, files that are created and then deleted between the first and last hourly snapshot being merged may be skipped completely in determining the merged snapshot because the underlying file system may be aware of the file status over time while a configuration applying incremental changes would only be aware of the one-hour differences to the substantially ready-to-run disk image.

Furthermore, the above configuration of the BDR may allow for the more efficient management and generation of remote synchronization files because the local BDR device (for example, a backup aggregator) may have a backup retention schedule that differs from the remote BDR device. As such, the local BDR device may in some embodiments generate custom replication files that represent substantially ready-to-run disk image states at times spaced apart further than that actually available (e.g., replication files representing daily overall changes to the underlying snapshot file system, whereas the underlying snapshot file system itself stores hourly snapshot information). The ability of the BDR to store previous states of a single substantially ready-to-run disk image in a manner that allows the computationally efficient determination of exactly the differences that should be applied to a remote BDR device snapshot file system to allow the remote BDR device to determine the state of the substantially ready-to-run disk image according to its own backup schedule may be utilized by a BDR administrator to optimize network transfer requirements and push required computational processing overhead to devices that are best able to perform them.

According to an exemplary embodiment, other types of policies may be implemented for example, a maximum rolling retention policy may be configured to retain restore points according to a repository's maximum storage capacity, once the storage limit is about to be reached then any number of intermediate segments may be removed from the repository without affecting the functionality of the latest restore point.

As shown in FIG. 1A, the BDR network provides an image-based backup solution wherein a local device, e.g. a backup aggregators 102*a* and 102*b*, are responsible for and facilitate the aggregation of image-based backups from a plurality of client devices 103*a*, 104*a*, 103*b*, 104*b* local to and/or in communication with the backup aggregators 102*a* and 102*b*. For example, in one embodiment, a given BDR client site, e.g. 101*a* and 101*b*, may have one or more backup aggregators in communication on a local area network. Client devices, which may be servers, workstations, laptops, and/or the like, e.g. 103*a*, 104*a*, 103*b*, 104*b* may also be in communication with backup aggregators 102*a* and 102*b* on a local area network 105*a*, 106*a*, 105*b*, 106*b* and periodically transfer a representation of a block level storage device to backup aggregators 102*a* and 102*b*. The backup aggregator may thereafter generate a snapshot of the received image backup file(s) according to a local backup schedule. The snapshot operation may be server specific, such as for example a local backup snapshot policy that generates hourly backups for a mission-critical mail server while only generating daily snapshots of image backup files from a user's laptop. The BDR may also be configured such that the transfer of image-based backup files from client devices (such as servers, workstations, laptops, etc. described above) may differ from the local snapshot policy itself.

According to an exemplary embodiment, backup aggregators 102a and 102b may maintain such a local backup policy while additionally maintaining a remote backup policy. The remote backup policy may be a backup policy maintained at the backup aggregator that determines how frequently the backup aggregator will synchronize certain image-based backup file snapshot data with remote cloud storage center 109 via one or more of communication networks 107a, 107b, 108a and 108b. In one embodiment, backup aggregator 102a may coordinate the execution of its remote backup schedule with a master server 110. The master server may receive from the backup aggregator an indication of the backup aggregator's last known storage server pairing within the cloud storage center 109. A storage server, for example StorageServer A 111a, may be a server that is directly paired with the backup aggregator such that is capable of receiving and applying to its own snapshot capable file system a received send file representing the file system differences between image-based file backups snapshotted at two different points in time.

After coordinating with master server 110, backup aggregator 102a may thereafter initiate a send file transfer operation, e.g., 108a, with its paired storage server 111a within the cloud storage center. In some embodiments, storage server 111a may itself have a paired or file system mirroring relationship with a second storage server. Such a BDR configuration may be useful in cases where the image-based backup snapshot history maintained on the backup aggregator would be advantageously stored on both the backup aggregator's paired server, e.g., 111a, and a secondary storage server located in a different geographical location. Such a configuration may enable recovery of cloud storage center stored image snapshot data even in scenarios where cloud storage center 109 is completely destroyed.

Furthermore, in one embodiment, the master server may direct the activity of multiple backup aggregators as well as manage or direct the pairing of backup aggregators with different storage server nodes within cloud storage center 109, e.g., 101b-108b, 111b. It should be understood that the maintenance of the local or remote backup policy need not necessarily be performed by a backup aggregator device. For example, the master server or a storage server could instead maintain a backup policy associated with the backup aggregator. In such a configuration, the coordination of the backup aggregator with the master server may, for example, additionally comprise sending or receiving information about the currently active local or remote backup policy associated with the backup aggregator.

Figure 1B:
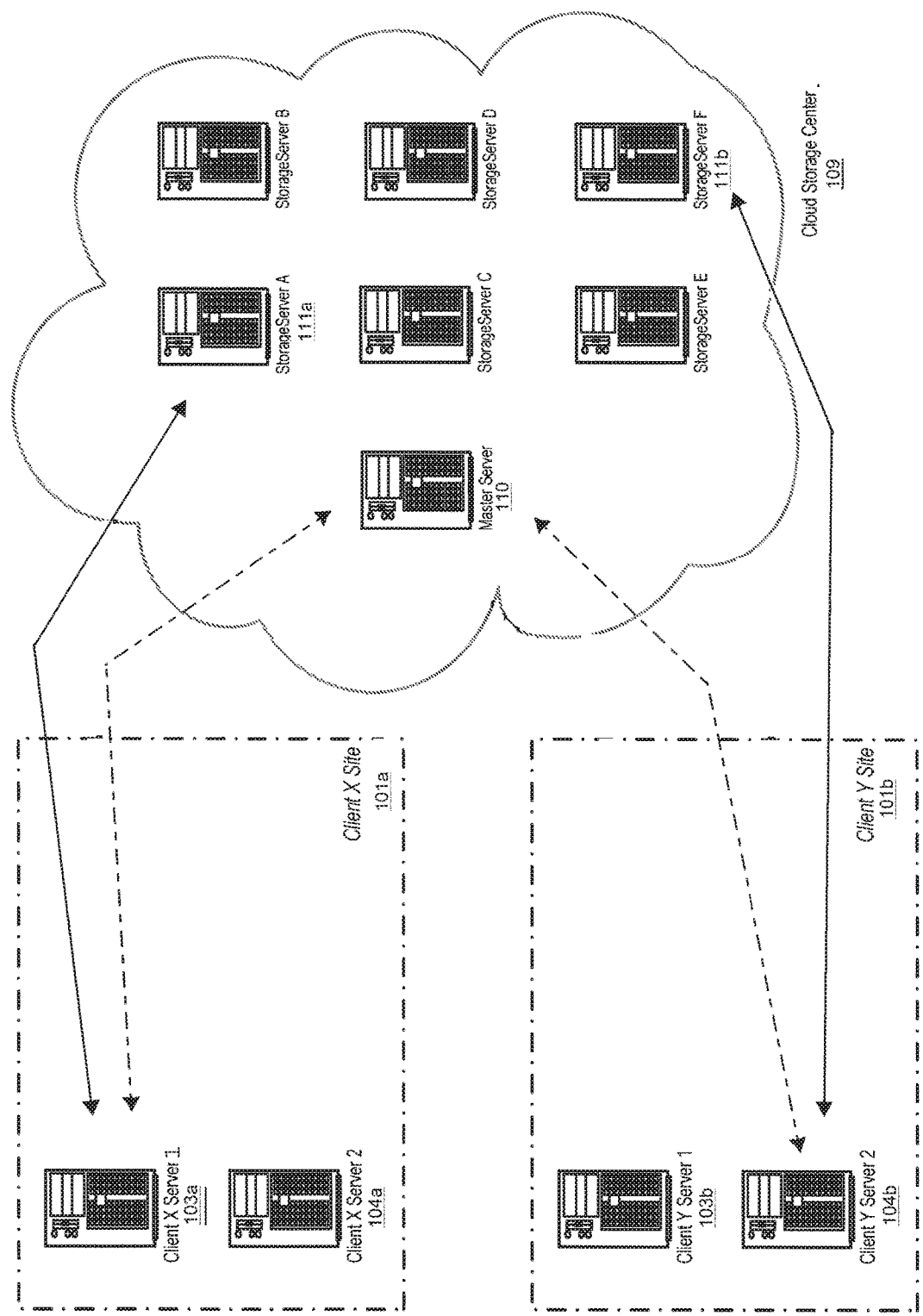
FIG. 1B shows a block diagram of a backup network system without a local Backup Aggregator according to an exemplary embodiment of this disclosure.

With reference to FIG. 1B, a block diagram is shown of a backup network system without a local Backup Aggregator according to an exemplary embodiment of this disclosure.

As shown, client servers 103a, 104a, 103b and 104b communicate directly with the master server 110 associated with cloud storage center 109. According to an exemplary embodiment, the backup aggregator functionality previously described with reference to FIG. 1A is performed by master server 110.

Figure 2:
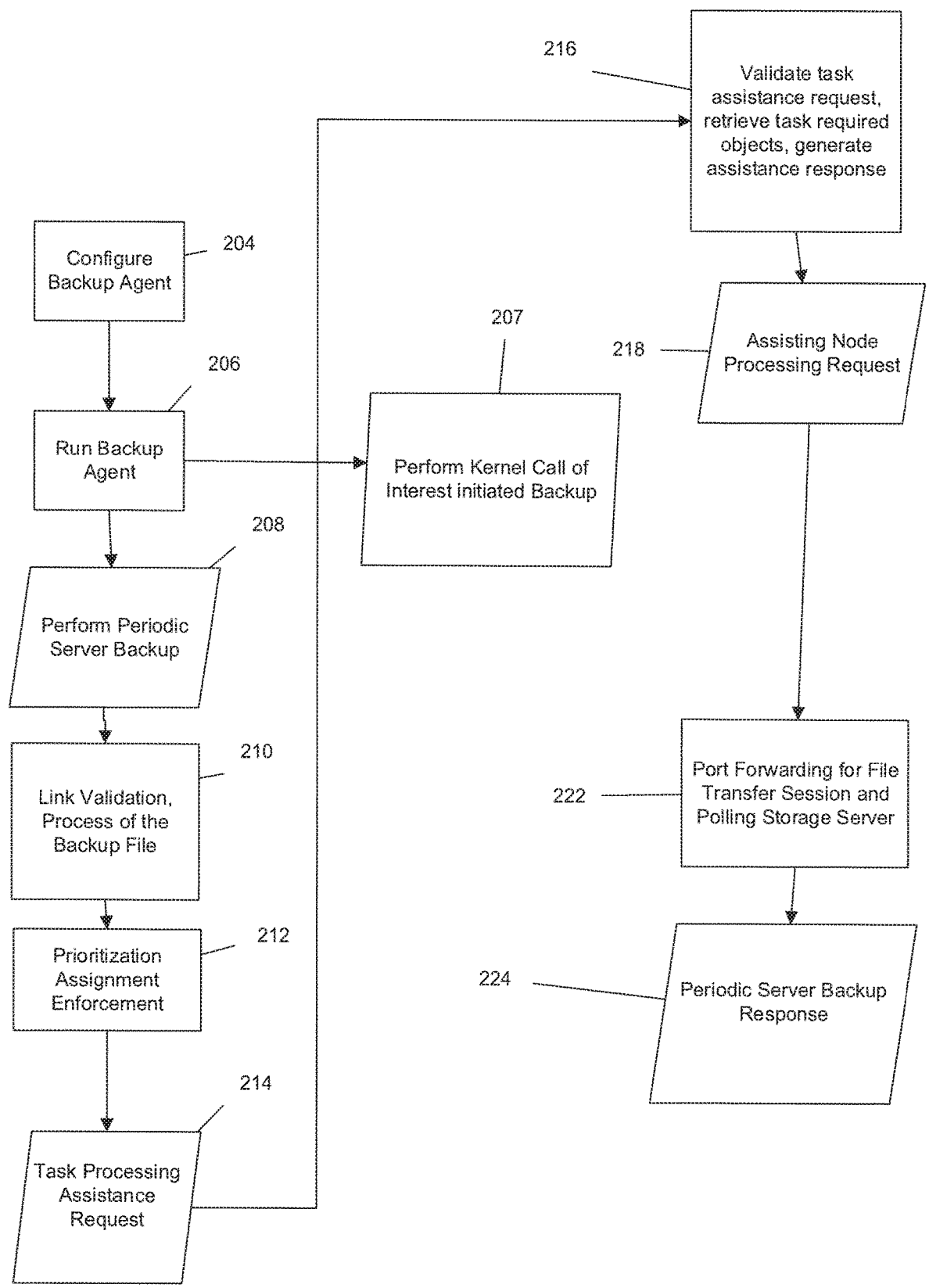
FIG. 2 is a flow chart of a method of performing a backup of one or more devices according to an exemplary embodiment of this disclosure.

FIG. 2 shows an example flow chart/data flow illustrating aspects of the management of a data replication and storage system, according to one implementation of a BDR operation. According to the exemplary embodiment, servers, workstations, mobile devices and the like may copy their data locally across a local area network to a local network device, from there it may automatically be replicated to a plurality of cloud storage centers.

In one embodiment, at step 204, a user in communication with a client device configures a backup agent installed on a device to perform a backup and replicate it over a plurality of storage devices utilizing features of the BDR. Thereafter, at step 206, the server may run its backup agent which may be programmed to generate and send periodic backup files to a BackupAggregator at step 208. A periodic backup file may comprise an image-based backup. An image-based backup is a block-by-block copy of a full hard drive. A block refers to a specific physical area on a hard drive which may contain data. Therefore, an image-based backup represents the content exactly as it was on the original storage device at the time the backup file was generated including operating system, and all data associated with it, the data stored in the system along with structural information and application configurations. However, the source used to create the image backup file need not actually be a physical hard drive and may, for example, be a virtual hard disk or even another image backup file. The embodiments described herein may be utilized on backup files that are based on a different formatting scheme but otherwise lend themselves to processing by the described embodiments of the BDR. Once generated, block level image backup files may serve as the basis for restoring a hard drive to a substantially similar state as present at the time of backup. Image backup files may contain additional data elements such as file system metadata that was present on the source drive, master boot records, partition information and/or the like. This manner of backup may be distinguished from what may be thought of as a "file/directory level" backup which merely duplicates the contents and location of files and/or directories contained on a hard drive without necessarily including additional metadata, file system data, etc.

In addition, the BackupAggregator may be prompted by a kernel call trace to perform a backup at step 207 outside the time frame of a previously scheduled backup, as will be described in detail below.

As previously described, the BackupAggregator may receive a periodic server backup file. Afterward, at step 210 the BackupAggregator may validate the link which connects it to the server and may process the received backup file.

At step 212, the BackupAggregator may perform backups, replication and restoration tasks following a prioritization order defined by the user. A non exhaustive list of BDR tasks that may be used with the systems, methods and apparatuses described herein is illustrated in the following Table 2.

TABLE 2

| Task ID | Task | Description |
| --- | --- | --- |
| S10 | takeSnapshot | Generates a read-only full copy of the file system volume |
| S20 | destroySnapshot | Deletes a snapshot from the storage pool |
| S30 | holdSnapshot | Prevents a snapshot from being destroyed |
| S40 | fetchSnapshot | Returns the last snapshot taken for a dataset |
| S50 | rollBack | Discards all changes made to a file system since an specific |

TABLE 2-continued

| Task ID | Task | Description |
|---|---|---|
| | | backup or snapshot was created |
| S60 | createClone | Creates a writable volume or file system whose initial contents are the same as the dataset from which it was created |
| S70 | compressFile | Reduces the size of a file |
| S80 | decompressFile | Convert the file to its original form size |
| S90 | generateIncremental | Keeps the files that have been altered between two given snapshots. |
| S100 | sendFile | Exports a file from the local file system to a compressed file stored locally on the sending machine, and then the file is sent to the receiving machine using the syncFile command. |
| S110 | streamFile | Exports a file from the local file system and the data is compressed as it is generated and streamed directly to the receiving machine. |
| S120 | receiveFile | Receives a file in a local directory of the receiving machine, then the file is extracted and imported to the receiving machine's file system. |
| S130 | sshKeyGeneration | Generates private and public keys for ssh tunneling session |
| S140 | sshConnect | Starts a tunneling session between two devices |
| S150 | syncFiole | Synchronizes files and directories from one location to another minimizing data transfers by using delta encoding when possible. |
| S160 | runScheduler | Runs a time-based job scheduler configured to perform tasks periodically on different entities of the BDR system |
| S180 | failover | Provides the means via virtualization or the restoration of a redundant system to move the activity on one device e.g., computer, server, system, or hardware component to another device in the event the first device is or expected to be no longer available. |
| S190 | calculateHealthMetrics | Retrieves a plurality of metrics including but not limited to fan speed, CPU temperature, disk space, memory space, power supply voltages and the like. |

According to another exemplary embodiment, the BDR may perform composite tasks comprising two or more simple or composite tasks. For example, the composite task backupDataset shown in Table 3 may comprises the tasks S10, S40, S90, S70, and S100.

TABLE 3

| Task ID | Parent Task ID | Task | Description | Task ID | subTask |
|---|---|---|---|---|---|
| C10 | null | backupDataset | Generates a backup file corresponding to a dataset and sends it to a repository | S10 S40 S90 S70 S100 | takeSnapshot FetchSnapshot generateIncremental compressFile sendFile |

A user may prioritize the transfer of certain type of files regardless from which device they have been received and/or may prioritize the transfer of files related to a specific machine depending on what the user deems as critical and/or necessary data. Furthermore, a second level of prioritization that conditionally favors certain tasks depending on the type of action they comprise may be utilized. For example, a second level priority order may be determined where tasks that specify a building file e.g., generateIncremental may have precedence over tasks that specify a streaming action. Similarly, a task that specifies a sending action e.g., syncFile call, may have precedence over tasks specifying building actions; lastly, tasks specifying a receiving action, e.g., receiveCall may have precedence over tasks specifying a sending action and therefore all other type of tasks (i.e., building and streaming). In one embodiment, the BDR may prioritize the processing of tasks based on the last successful sendFile operation. For example, if a number of sendFile operations for a particular replication incremental file have failed due to transient network issues, the BDR may prioritize the next sendFile operation (or one containing a sendFile operation) over other operations even if the BDR's default prioritization would otherwise instruct.

At step 214, the BackupAggregator may send a task processing assistance request to a master server. A task processing assistance request may be triggered periodically (e.g., every 10 minutes) and/or in response to determined events e.g., a failing to connect with a remote storage server.

In one embodiment, a master server may receive a task processing assistance request from a BackupAggregator. Thereafter, at step 216, the master server may perform a validity check of the task processing assistance request, retrieve task required objects which depending on the requester (i.e., BackupAggregator) may be one or more commands that may need to be executed and/or reconfiguration related tasks, the outcome of such commands will be included in a task processing assistance response which may be sent to the requester at a later time.

At step 218, a master server e.g., may send an assisting node processing request to a storage server. An assisting node processing request may be triggered periodically (e.g., every 10 min) and/or in response to determined events e.g., a reconfiguration of the BDR system. In one embodiment, an assistance node processing request may specify commands that are required to be performed by the storage server including but not limited to calculating how much disk space is available in the storage server, updating software e.g., file system software, logical volume manager software and the like. See U.S. Pat. No. 9,594,636, by Mortensen et al., issued Mar. 14, 2017 and entitled "MANAGEMENT OF DATA REPLICATION AND STORAGE APPARATUSES, METHODS AND SYSTEMS".

In one embodiment, the BackupAggregator may generate a replication file representing the differential between two snapshots represented by the BackupAggregator's underlying file system. The snapshots chosen as the endpoints for the replication file generation may not necessarily correspond to the time quantum at which the BackupAggregator receives and generates snapshots. As discussed herein, the replication file may be generated according to a backup retention requirement of a remote server, such as Storage-Server_E or Master Server. Because of the BDR's ability to generate replication files between arbitrary locally maintained snapshot points and transfer those replication files for application to a remote snapshot file system representation, network transfer and computational requirements may be optimized. An example command for generating a replication file at BackupAggregator, substantially in the form of php code and shell commands is disclosed in U.S. Pat. No. 9,594,636, by Mortensen et al., issued Mar. 14, 2017 and entitled "MANAGEMENT OF DATA REPLICATION AND STORAGE APPARATUSES, METHODS AND SYSTEMS".

At step 222, the BackupAggregator may start a port forwarding or TCP/IP connection tunneling (e.g., secure shell session) with the storage server to transfer a replication file. Thereafter, backup files may be replicated to synchronize the BackupAggregator and the storage server while minimizing data transfers. In one embodiment, the mechanism to start a port forwarding connection and synchronization process may be implemented substantially in the form of php code and shell commands as disclosed in U.S. Pat. No. 9,594,636, by Mortensen et al., issued Mar. 14, 2017 and entitled "MANAGEMENT OF DATA REPLICATION AND STORAGE APPARATUSES, METHODS AND SYSTEMS".

Concurrently, the BackupAggregator may start a polling process e.g., 222 which may continuously check the storage server for a notification message indicating that the synchronization process has been completed. In an alternative embodiment, the polling process may be directed to the master server which will be responsible of sending the notification message. Once the completion message has been emitted by the storage server the BackupAggregator may bring the tunneling session to an end. By utilizing a separate polling process to monitor the synchronization process allows the BDR to utilize a regularly updating file transfer path (e.g., secured via automatically rotating SSH keys) while allowing the polling of an individual transfer to proceed over a channel secured via a different mechanism. Such a separation additionally allows the BDR to monitor aspects of performance related to a synchronization command and thereafter adjust or modify task priorities as a result of the observed performance of otherwise lower level transfer commands utilized in some synchronization embodiments of the BDR. In one embodiment, the mechanism to perform the polling process may be implemented substantially in the form of PHP code as described in U.S. Pat. No. 9,594,636, by Mortensen et al., issued Mar. 14, 2017 and entitled "MANAGEMENT OF DATA REPLICATION AND STORAGE APPARATUSES, METHODS AND SYSTEMS".

In one embodiment, the storage server may start a port forwarding or TCP/IP connection tunneling (e.g. secure shell session) with the storage server. Thereafter, backup files may be synchronized from the storage server to the storage server while minimizing data transfers. An example of a mechanism to start a port forwarding connection and synchronization process has been already substantially shown in this specification. Concurrently, the storage server may start a polling process which will continuously check the storage server for a message indicating that the synchronization process has been completed. Once the completion message has been emitted by the storage server the storage server may bring the tunneling session to an end.

In one embodiment, the BackupAggregator may periodically revise a backup and snapshot schedule. An example backup and snapshot schedule, substantially in the form of XML-formatted data, is provided below:

```
<?XML version = "1.0" encoding = "UTF-8"?>
<local_backup_schedule>
    <backup id=001>
        <last_backup>2020-04-16 06:30:00</last_backup>
        <next_backup>2020-04-16 10:30:00</last_backup>
        <interval units=hour>4</interval>
        <dataset>012</dataset>
    </backup>
    <backup id=002>
        <last_backup>2020-04-16 09:00:00</last_backup>
        <next_backup>2020-04-18 09:00:00</last_backup>
        <interval units=days>2</interval>
        <dataset>037</dataset>
    </backup>
    <backup id=003>
        <last_backup>2020-04-16 15:20:00</last_backup>
        <next_backup>2020-04-18 15:30:00</last_backup>
        <interval units=minutes>10</interval>
        <dataset>023</dataset>
    </backup>
</local_backup_schedule>
```

At step 224, the server may receive the backup request and consequently may send a backup response. In one embodiment, the BackupAggregator may receive the backup response and afterward take a snapshot of the backup image file. Thereafter, the BackupAggregator may determine if the snapshot should be replicated to a remote storage server utilizing a remote backup schedule. An example remote backup schedule, substantially in the form of XML-formatted data, is described in U.S. Pat. No. 9,594,636, by Mortensen et al., issued Mar. 14, 2017 and entitled "MANAGEMENT OF DATA REPLICATION AND STORAGE APPARATUSES, METHODS AND SYSTEMS".

Figure 3:
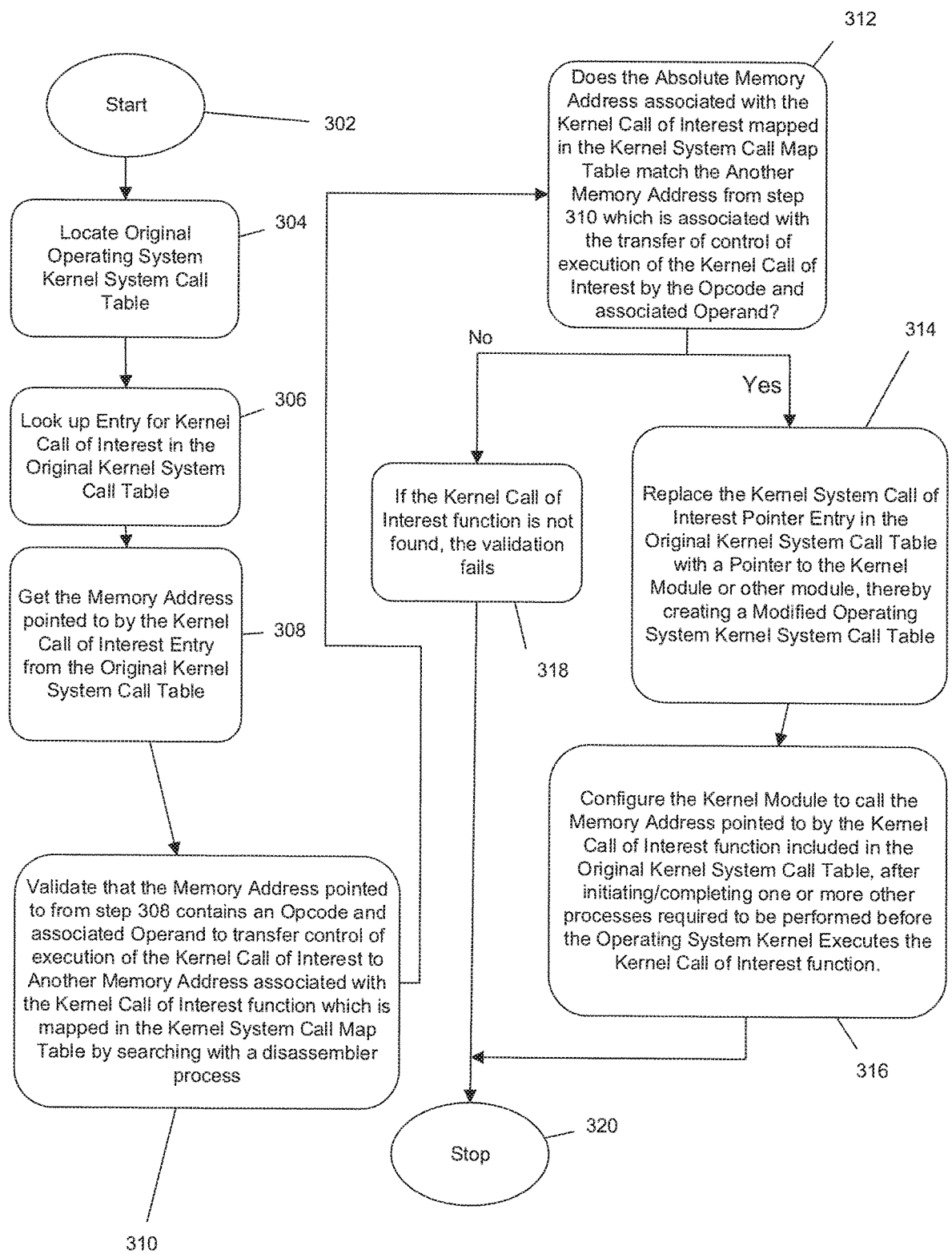
FIG. 3 is a flow chart of a method of tracing/verifying a kernel call of interest using a disassembler process according to an exemplary embodiment of this disclosure.

With reference to FIG. 3, shown is a flow chart of a method of tracing/verifying a kernel call of interest using a disassembler process according to an exemplary embodiment of this disclosure.

At step 302, the method starts.

At step 304, the method locates the original operating system kernel system call table.

At step 306, the method looks up an entry for the kernel call of interest in the original kernel system call table.

At step 308, the method gets the memory address pointed to by the kernel call of interest entry from the original kernel system call table.

At step 310, the method validates that the memory address pointed to from step 308 contains an opcode and associated operand to transfer control of execution of the kernel call of interest to another memory address associated with the kernel call of interest function which is mapped in the kernel system call map table by searching with a disassembler process.

At step 312, the method determines if the absolute memory address associated with the kernel call of interest mapped in the kernel system call map table matches the "another" memory address from step 310 which is associated with the transfer of control of execution of the kernel call of interest by the opcode and associated operand.

If there is no match in step 312, at step 318, the method determines that if the kernel call of interest function is not found, the validation fails, and the method stops at step 320.

If there is a match in step 312, at step 314, the method replaces the kernel system call of interest pointer entry in the original kernel system call table with a pointer to the kernel module or other module, thereby creating a modified operating system kernel system call table.

At step 316, the method configures the kernel module to call the memory address pointed to by the kernel call of interest function included in the original kernel system call table, after initiating/completing one or more other processes required to be performed before the operating system kernel executes the kernel call of interest function.

At step 320, the method stops.

Figure 4:
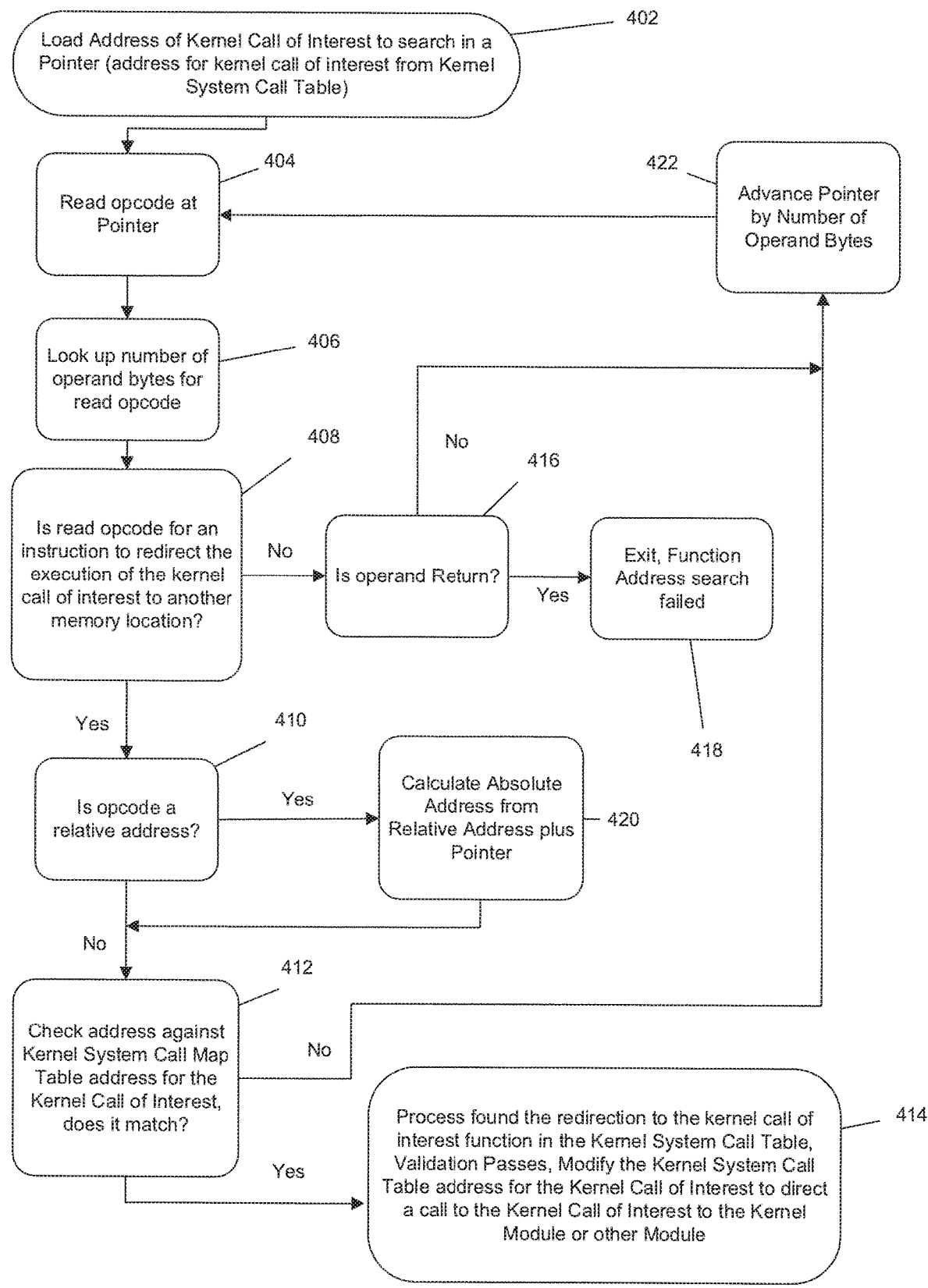
FIG. 4 is a flow chart of a disassembler process used to trace/verify a kernel call of interest according to an exemplary embodiment of this disclosure.

With reference to FIG. 4, shown is a flow chart of a disassembler process used to trace/verify a kernel call of interest according to an exemplary embodiment of this disclosure.

At step 402, the method loads the address of the kernel call of interest to search into a pointer (address for kernel call of interest from kernel system call table).

At step 404, the method reads the opcode at the pointer.

At step 406, the method looks up the number of operand bytes for the read opcode.

At step 408, the method determines if the read opcode is for an instruction to redirect the execution of the kernel call of interest to another memory location. If No, at step 416, the method determines if the operand is a return and if Yes, at step 418, the method exits, function address search failed. If the operand is not a Return, at step 422, the method advances the pointer by the number of operand bytes to the next sequential opcode and returns to step 404 to read the opcode at the pointer.

If at step 408, if it is determined the read opcode is an instruction to redirect the execution of the kernel functions of interest, then at step 410, the method determines if the opcode is a relative address. If Yes, then at step 420, the method calculates the absolute address as the relative address plus the pointer.

At step 412, the method checks the address against the kernel system call map table address for the kernel call of interest to determine if it matches. If No, the method advances to step 422 to advance the pointer by the number of operand bytes to the next sequential opcode and returns to step 404 to read the opcode at the pointer. If Yes, at step 414, the method process found the redirection to the kernel call of interest function in the kernel system call table, validation passes, and the kernel system call table address is modified for the kernel call of interest to direct a call to the kernel call of interest to the kernel module or other module.

Figure 5:
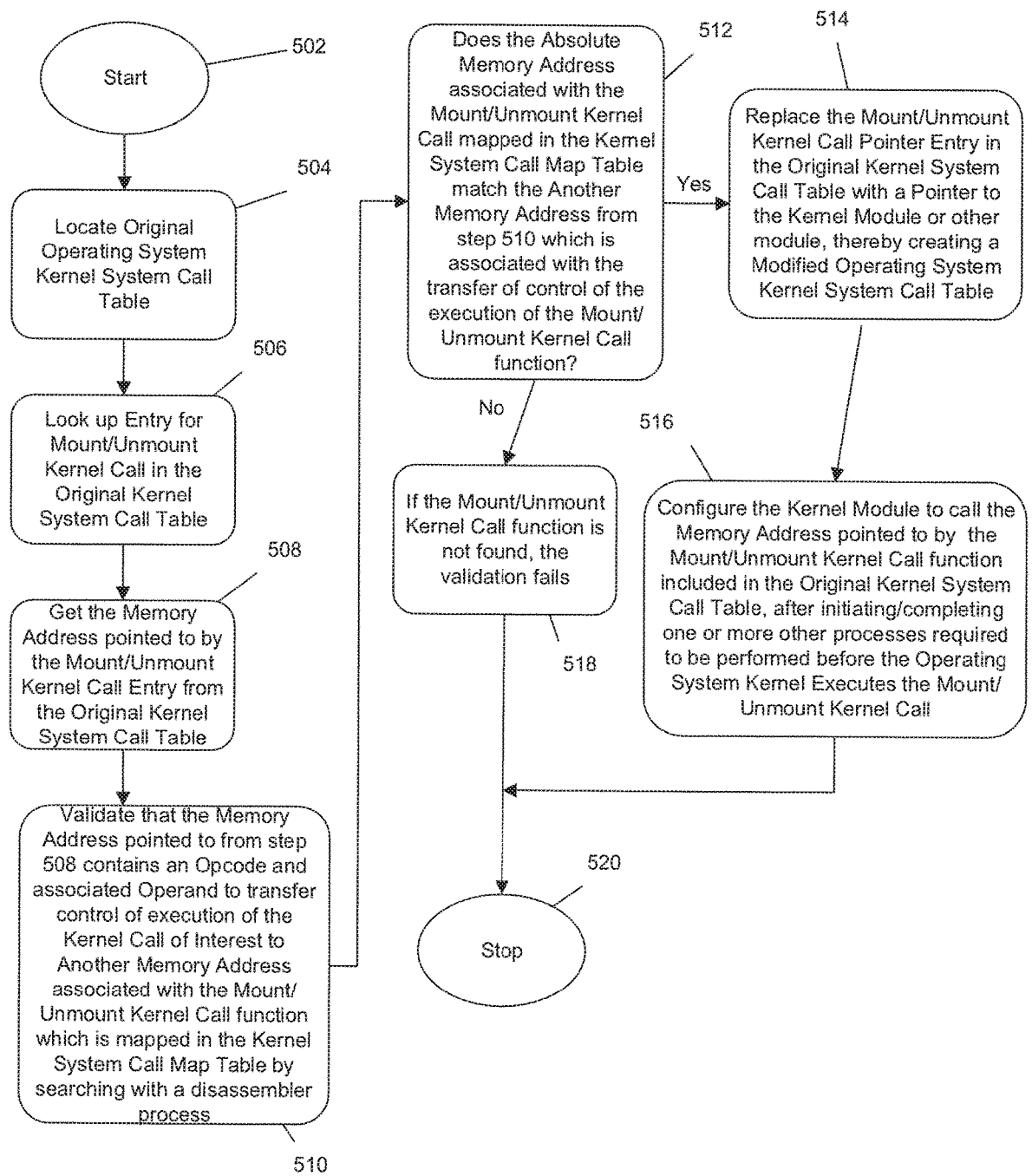
FIG. 5 is a flowchart of a method of tracing/verifying a mount/unmount kernel call using a disassembler process according to an exemplary embodiment of this disclosure.

With reference to FIG. 5, a flowchart is shown of a method of tracing/verifying a mount/unmount kernel call using a disassembler process according to an exemplary embodiment of this disclosure.

At step 502, the method starts.

At step 504, the method locates the original operating system kernel system call table.

At step 506, the method looks up the entry for a mount/unmount kernel call in the original kernel system call table.

At step 508, the method gets the memory address pointed to by the mount/unmount kernel call function from the original kernel system call table.

At step 510, the method validates that the memory address pointed to from step 508 contains an opcode and associated operand to transfer control of execution of the kernel call of interest to another memory address associated with the mount/unmount kernel call function mapped in the kernel system call map table by searching with a disassembler process.

At step 512, the method determines if the absolute memory address associated with the mount/unmount kernel call mapped in the kernel system call map table matches the "another" memory address from step 510 which is associated with the transfer of control of the execution of the mount/unmount kernel call function. If Yes, at step 514, the method replaces the mount/unmount kernel call pointer entry in the original kernel system call map table with a pointer to the kernel module or other module, thereby creating a modified operating system kernel system call table. At step 516, the method configures the kernel module to call the memory address pointed to by the mount/unmount kernel call function included in the original kernel system call table, after initiating/completing one or more other processes required to be performed before the operating system kernel executes the mount/unmount kernel call and stops at step 520. If No, at step 518, the method determines the mount/unmount kernel call function is not found, the validation fails and the method stops at step 520.

Figure 6:
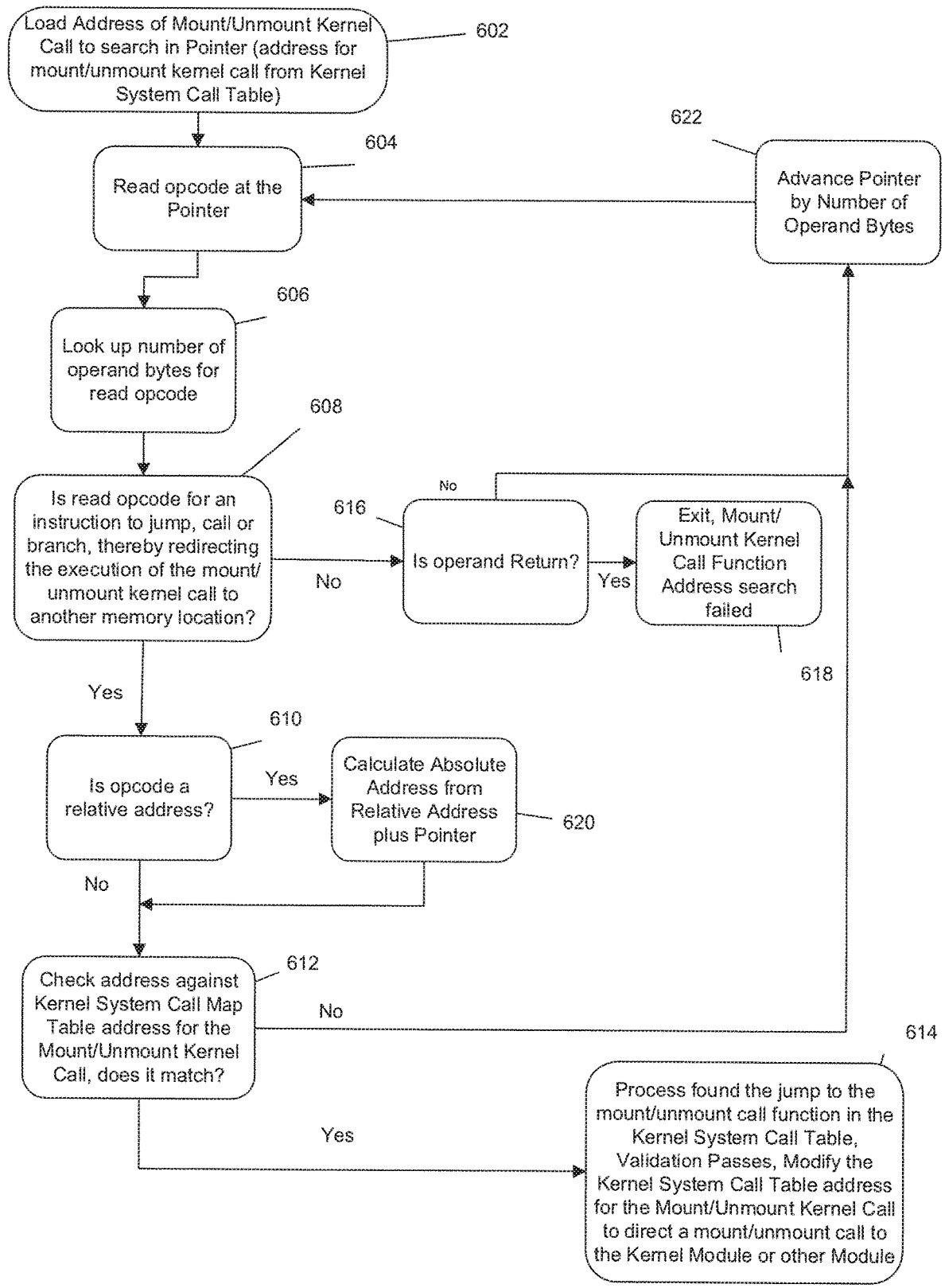
FIG. 6 is a flow chart of a disassembler process used to trace/verify a mount/unmount kernel call according to an exemplary embodiment of this disclosure.

With reference to FIG. 6, a flow chart is shown of a disassemble process used to trace/verify a mount/unmount kernel call according to an exemplary embodiment of this disclosure.

At step 602, the method loads the address of mount/unmount kernel call to search in the pointer (address for mount/unmount kernel call from kernel system call table).

At step 604, the method reads the opcode at the pointer.

At step 606, the method looks up the number of operand bytes for the read opcode.

At step 608, the method determines if the read opcode at step 604 is for an instruction to jump, call or branch, thereby redirecting the execution of the mount/unmount kernel call to another memory location. If No, at step 616, the method determines if the operand is a return. If Yes, at step 618, the method exits because the mount/unmount kernel call function address search failed. If the operand is not a return, at step 622, the method advances the pointer by the number of operand bytes to the next sequential opcode and returns to step 604 to read the next sequential opcode at the pointer.

At step 608, if it is determined the read opcode is an instruction to redirect the execution of the mount/unmount kernel call, then at step 610, the method determines if the opcode is a relative address. If Yes, then at step 620, the method calculates the absolute address from the relative address plus the pointer.

At step 612, the method checks the absolute address against the kernel system call map table address for the mount/unmount kernel call to determine if they match. If No, the method advances to step 622 to advance the pointer by the number of operand bytes and returns to step 604 to read the next sequential opcode at the pointer. If Yes, at step 614, the method found the jump to the mount/unmount call function in the kernel system call table, validation passes, and the kernel system call table address is modified for the mount/unmount kernel call to direct a mount/unmount call to the kernel module or other module.

To further illustrate, provided below are example partial listings of a kernel system call table, opcode(s)/operands(s) and kernel system call map table, as previously described.

| Opcode/Operand Listing | |
| --- | --- |
| Memory Address | Opcode/Operand |
| $F0001000 | MOV AX, 0 |
| $F0001004 | JUMP $F0002000 |
| $F0001008 | RETURN |

| Kernel System Call Table Listing | |
| --- | --- |
| CALL | Memory Address Pointer |
| read | $F0000600 |
| open | $F0000700 |
| close | $F0000800 |
| flush | $F0000900 |
| mount | $F0001000 |
| unmount | $F0001100 |
| ... | |

| Kernel System Call Map Table Listing | |
| --- | --- |
| CALL | Memory Address Pointer |
| read | $F0004000 |
| open | $F0004010 |
| close | $F0004020 |
| flush | $F0004030 |
| mount | $F0002000 |
| unmount | $F0002100 |
| ... | |

As shown, the mount call pointer associated with the kernel system call table points to memory address $F0001000 of the opcode/operand listing. During execution of the disassembler process described in FIG. 6 for validation of the mount call, the disassembler process determines the MOV opcode at $F0001000 is not a jump, call or branch, and then proceeds to the next sequential opcode at $F0001004 which includes a jump call and operand associated pointer memory address of $F0002000, which matches the memory address pointed to by the mount call mapped in the kernel system call map table listing, thereby validating the kernel system mount call listed in the kernel system call table.

Figure 7:
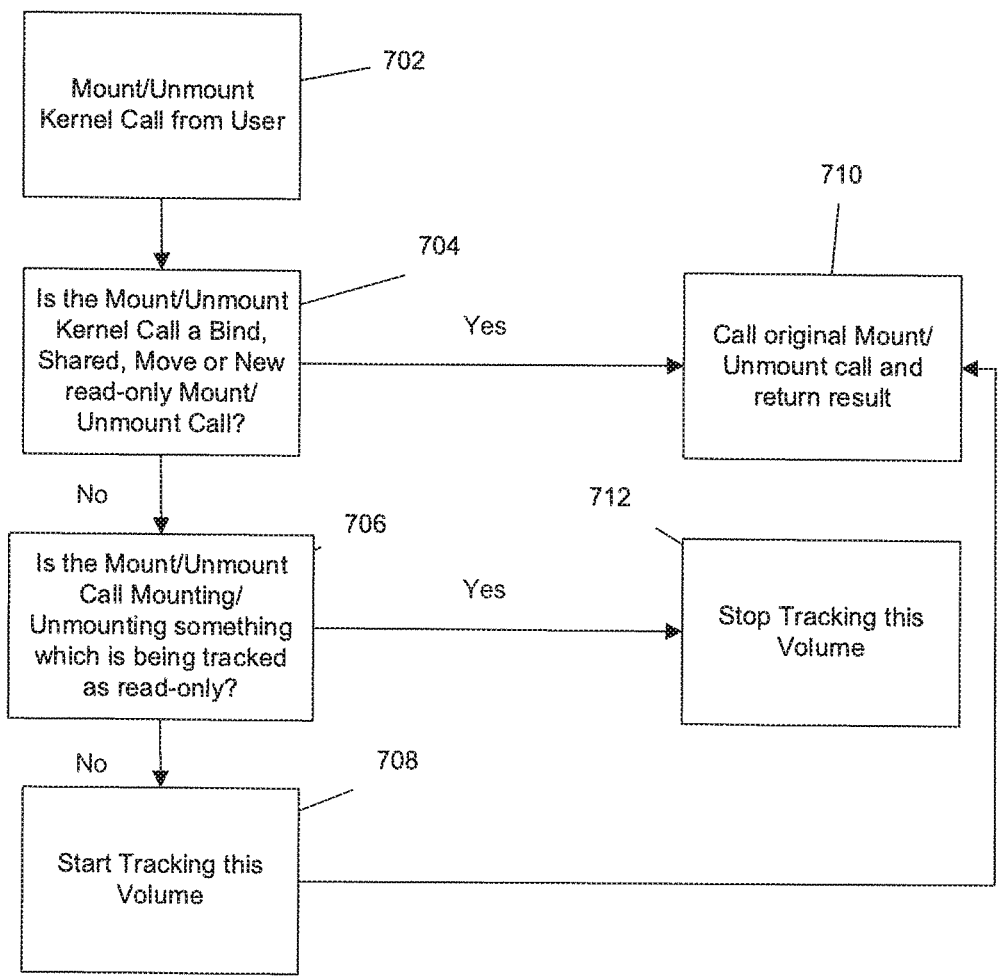
FIG. 7 is a flow chart of an execution of a kernel mount/unmount call including a modified kernel system call table modified using a disassembler process to trace/verify the kernel mount/unmount call according to an exemplary embodiment of this disclosure.

With reference to FIG. 7, a flow chart is shown of an execution of a kernel mount/unmount call including a modified kernel system call table modified using a disassembler process to trace/verify the kernel mount/unmount call according to an exemplary embodiment of this disclosure.

At step 702, the method determines a mount/unmount kernel is called by a user.

At step 704, the method determines if the mount/unmount kernel call is a bind, shared, move or new read-only mount/unmount call. If Yes, at step 710, the method calls the original mount/unmount call and returns the results. If No, the method proceeds to step 706 and determines if the mount/unmount call is mounting/unmounting something which is being tracked as read-only.

At step 706, if the method determines the mount/unmount call is mounting/unmounting something which is being tracked as read-only, at step 712, the method stops tracking this volume. If No, the method proceeds to step 708.

At step 708, the method starts tracking this volume and the method advances to step 710 to call the original mount/unmount call and return result.

Figure 8:
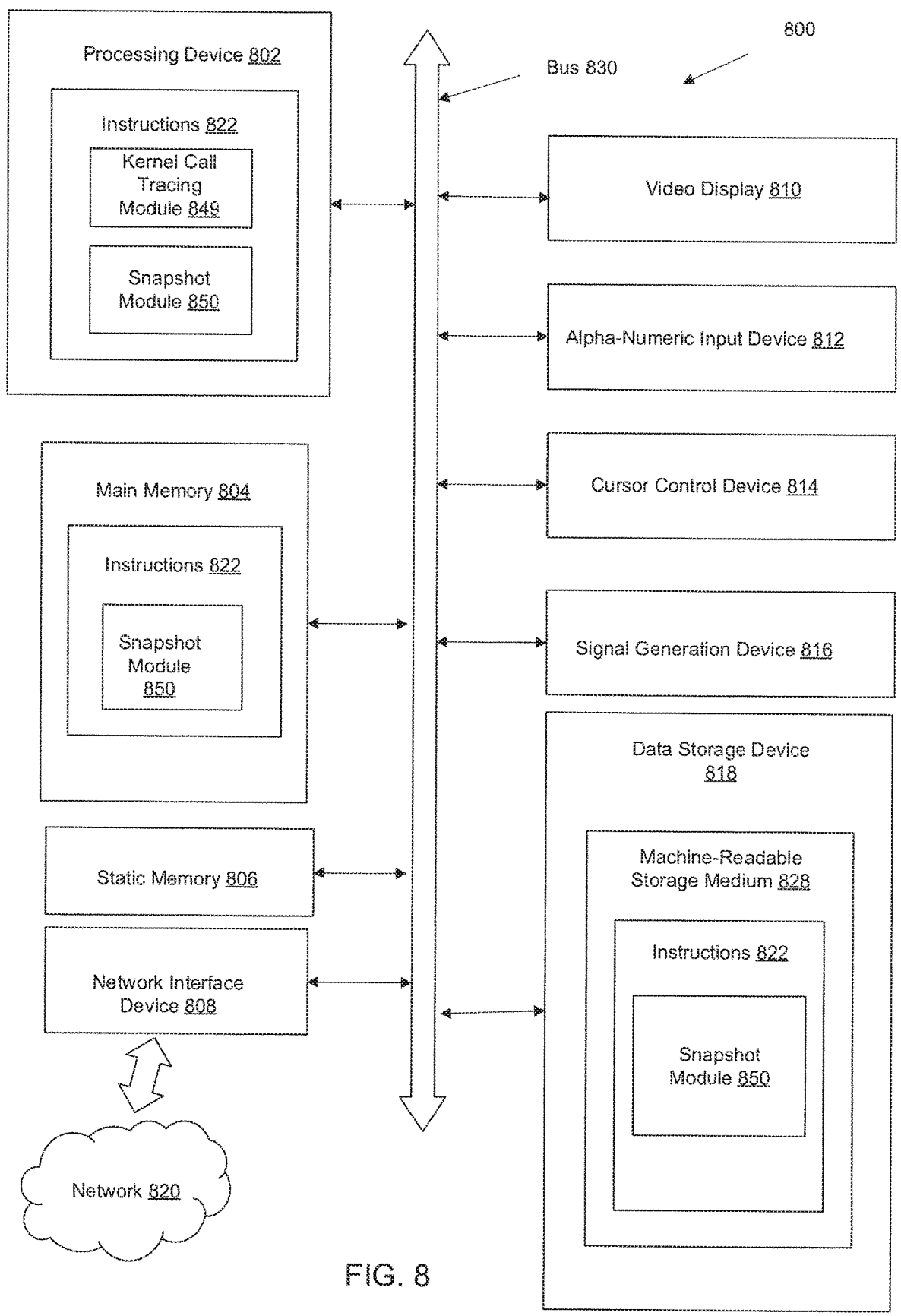
FIG. 8 is a block diagram of a computer system with a set of instructions to perform a backup method according to an exemplary embodiment of this disclosure.

With reference to FIG. 8, a block diagram is shown of a computer system with a set of instructions to perform a backup method according to an exemplary embodiment of this disclosure.

FIG. 8 illustrates an example machine of a computer system 800 within which a set of instructions, for causing the machine to perform any one or more of the methodologies discussed herein, may be executed. For example, client devices (e.g., 103a, 104a, 103b, 104b), backup aggregators (e.g., 102a, 102b), master server 110, and/or StorageServers A-F (e.g., 111a, 111b) may be implemented on machines similar to computer system 800. According to various embodiments, the machine may be connected (e.g., networked 820) to other machines in a LAN, an intranet, an extranet, and/or the Internet. The machine may operate in the capacity of a server (e.g., master server 110) or a client machine (e.g., client devices 103a, 104a, 103b, 104b, or backup aggregators 102a, 102b) in a client-server network environment, or as a peer machine in a peer-to-peer (or distributed) network environment (e.g., StorageServers A-F, e.g., 111a, 111b).

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or rambus DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, a graphical processing unit (GPU), or the like. The processing device 802 is configured to execute instructions 822 for performing the operations and steps discussed herein.

The computing system 800 may further include a network interface device 808. The computing system 800 also may optionally include a video display unit 810 (e.g., a liquid crystal display (LCD), Light Emitting Diode (LED) monitor, or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-readable storage medium 828 (also known as a computer-readable medium) on which is stored one or more sets of instructions 822 or software embodying any one or more of the methodologies or functions described herein. The instructions 822 may also reside, completely or at least partially, within the main memory 804 and/or within the processing device 802 during execution thereof by the computer system 800, the main memory 804 and the processing device 802 also constituting machine-readable storage media.

In one implementation, the instructions 822 include instructions for a kernel call tracing module 849 and snapshot module 850, and/or a software library containing methods that can be called by the kernel call tracing module 849 and the snapshot module 850. The instructions in the kernel call tracing module 849 and the snapshot module 850 and/or the software library may be used to the implement, as described above in relation to FIGS. 2-7. While the machine-readable storage medium 828 is shown in an example implementation to be a single medium, the term "machine-readable storage medium" includes a single medium or multiple media (e.g., a centralized or distributed database, and/or associated caches and servers) that store the one or more sets of instructions. The term "machine-readable storage medium" also includes any medium that is capable of storing or encoding a set of instructions for execution by the machine and that cause the machine to perform any one or more of the methodologies of the present disclosure. The term "machine-readable storage medium" accordingly includes, but is not limited to, solid-state memories, optical media and magnetic media.

Figure 9:
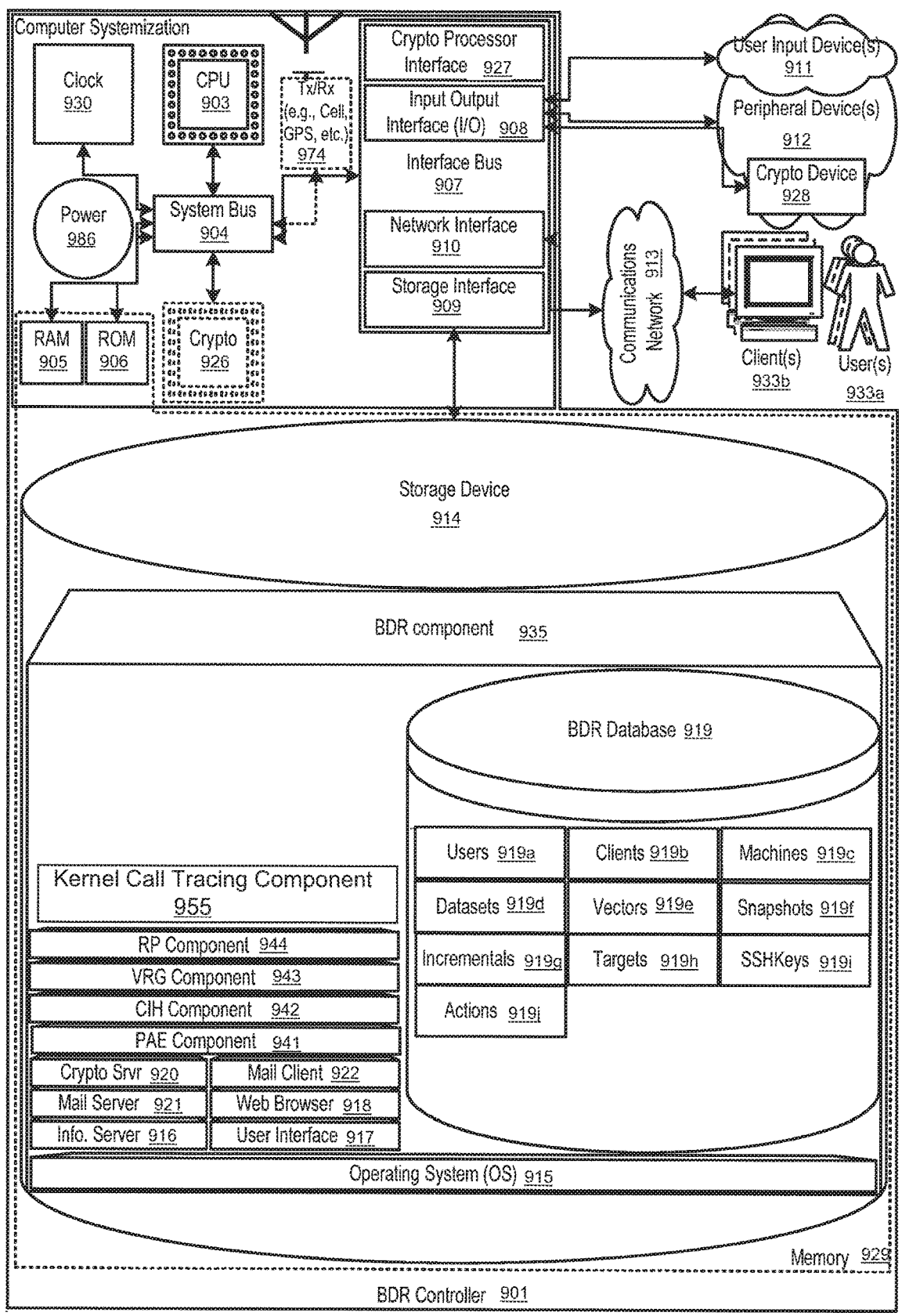
FIG. 9 is a block diagram of a system for managing the replication and storage of data sets associated with one or more client devices including a backup aggregator and operatively associated backup agent running on the one or more client devices according to an exemplary embodiment of this disclosure.

With Reference to FIG. 9, a block diagram is shown of a system for managing the replication and storage of data sets associated with one or more client devices including a backup aggregator and operatively associated backup agent running on the one or more client devices according to an exemplary embodiment of this disclosure.

BDR Controller

FIG. 9 shows a block diagram illustrating embodiments of a BDR controller. In this embodiment, the BDR controller 901 may serve to aggregate, process, store, search, serve, identify, instruct, generate, match, and/or facilitate interactions with a computer through various technologies, and/or other related data.

Typically, users, which may be people and/or other systems, may engage information technology systems (e.g., computers) to facilitate information processing. In turn, computers employ processors to process information; such processors 903 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the BDR controller 901 may be connected to and/or communicate with entities such as, but not limited to: one or more users from user input devices 911; peripheral devices 912; an optional cryptographic processor device 928; and/or a communications network 913.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The BDR controller 901 may be based on computer systems that may comprise, but are not limited to, components such as: a computer systemization connected to memory 929.

Computer Systemization

A computer systemization may comprise a clock 930, central processing unit ("CPU(s)" and/or "processor(s)" (these terms are used interchangeable throughout the disclosure unless noted to the contrary)) 903, a memory 929 (e.g., a read only memory (ROM) 906, a random access memory (RAM) 905, etc.), and/or an interface bus 907, and most frequently, although not necessarily, are all interconnected and/or communicating through a system bus 904 on one or more (mother)board(s) having conductive and/or otherwise transportive circuit pathways through which instructions (e.g., binary encoded signals) may travel to effectuate communications, operations, storage, etc. The computer systemization may be connected to a power source 986; e.g., optionally the power source may be internal. Optionally, a cryptographic processor 926 and/or transceivers (e.g., ICs) 974 may be connected to the system bus. In another embodiment, the cryptographic processor and/or transceivers may be connected as either internal and/or external peripheral devices 912 via the interface bus I/O. In turn, the transceivers may be connected to antenna(s), thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing BDR controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the BDR controller and beyond through various interfaces. Should processing requirements dictate a greater amount speed and/or capacity, distributed processors (e.g., Distributed BDR), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the BDR may be achieved by implementing a microcontroller such as CAST's R8051XC2 microcontroller; Intel's MCS 51 (i.e., 8051 microcontroller); and/or the like. Also, to implement certain features of the BDR, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the BDR component collection (distributed or otherwise) and/or features may be implemented via the microprocessor and/or via embedded components; e.g., via ASIC, coprocessor, DSP, FPGA, and/or the like. Alternately, some implementations of the BDR may be implemented with embedded components that are configured and used to achieve a variety of features or signal processing.

Depending on the particular implementation, the embedded components may include software solutions, hardware solutions, and/or some combination of both hardware/software solutions. For example, BDR features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the BDR features. A hierarchy of programmable interconnects allow logic blocks to be interconnected as needed by the BDR system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the BDR may be developed on regular FPGAs and then migrated into a fixed version that more resembles ASIC implementations. Alternate or coordinating implementations may migrate BDR controller features to a final ASIC instead of or in addition to FPGAs. Depending on the implementation all of the aforementioned embedded components and microprocessors may be considered the "CPU" and/or "processor" for the BDR.

Power Source

The power source 986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the BDR thereby providing an electric current to all subsequent components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus(ses) 907 may accept, connect, and/or communicate to a number of interface adapters, conventionally although not necessarily in the form of adapter cards, such as but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 910 may accept, communicate, and/or connect to a communications network 913. Through a communications network 913, the BDR controller is accessible through remote clients 933b (e.g., computers with web browsers) by users 933a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed BDR), architectures may similarly be employed to pool, load balance, and/or otherwise increase the communicative bandwidth required by the BDR controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user input devices 911, peripheral devices 912, cryptographic processor devices 928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 911 often are a type of peripheral device 912 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 912 may be connected and/or communicate to I/O and/or other facilities of the like such as network interfaces, storage interfaces, directly to the interface bus, system bus, the CPU, and/or the like. Peripheral devices may be external, internal and/or part of the BDR controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 928), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the BDR controller may be embodied as an embedded, dedicated, and/or monitor-less (i.e., headless) device, wherein access would be provided over a network interface connection.

Cryptographic units such as, but not limited to, microcontrollers, processors 926, interfaces 927, and/or devices 928 may be attached, and/or communicate with the BDR controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that the BDR controller and/or a computer systemization may employ various forms of memory 929. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 929 will include ROM 906, RAM 905, and a storage device 914. A storage device 914 may be any conventional computer system storage. Storage devices may include a drum; a (fixed and/or removable) magnetic disk drive; a magneto-optical drive; an optical drive (i.e., Blu-ray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 929 may contain a collection of program and/or database components and/or data such as, but not limited to: operating system component(s) 915 (operating system); information server component(s) 916 (information server); user interface component(s) 917 (user interface); Web browser component(s) 918 (Web browser); database(s) 919; mail server component(s) 921; mail client component(s) 922; cryptographic server component(s) 920 (cryptographic server); the BDR component(s) 935; PAE component 941, CIH component 942, VRG component 943, RP component 944, kernel call tracing component 955; and/or the like (i.e., collectively a component collection). These components may be stored and accessed from the storage devices and/or from storage devices accessible through an interface bus. Although non-conventional program components such as those in the component collection, typically, are stored in a local storage device 914, they may also be loaded and/or stored in memory such as: peripheral devices, RAM, remote storage facilities through a communications network, ROM, various forms of memory, and/or the like.

Operating System

The operating system component 915 is an executable program component facilitating the operation of the BDR controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP/Win7 (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the BDR controller to communicate with other entities through a communications network 913. Various communication protocols may be used by the BDR controller as a subcarrier transport mechanism for interaction, such as, but not limited to: multicast, TCP/IP, UDP, unicast, and/or the like.

Information Server

An information server component 916 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C # and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers and allows for the manipulated generation of the Web pages through interaction with other program components. After a Domain Name System (DNS) resolution portion of an HTTP request is resolved to a particular information server, the information server resolves requests for information at specified locations on the BDR controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the BDR database 919, operating systems, other program components, user interfaces, Web browsers, and/or the like.

Access to the BDR database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the BDR. In one embodiment, the information server would provide a Web form accessible by a Web browser. Entries made into supplied fields in the Web form are tagged as having been entered into the particular fields and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the BDR as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery UI, MooTools, Prototype, script.aculo.us, SWFObject, Yahoo! User Interface, any of which may be used and provide a baseline and means of accessing and displaying information graphically to users.

A user interface component 917 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 918 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Firefox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the BDR enabled nodes. The combined application may be nugatory on systems employing standard Web browsers.

Mail Server

A mail server component 921 is a stored program component that is executed by a CPU 903. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C # and/or .NET, CGI scripts, Java, JavaScript, PERF, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POPS), simple mail transfer protocol (SMTP), and/or the like. The mail server can route, forward, and process incoming and outgoing mail messages that have been sent, relayed and/or otherwise traversing through and/or to the BDR.

Access to the BDR mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 922 is a stored program component that is executed by a CPU 903. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 920 is a stored program component that is executed by a CPU 903, cryptographic processor 926, cryptographic processor interface 927, cryptographic processor device 928, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the BDR may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the BDR component to engage in secure transactions if so desired. The cryptographic component facilitates the secure accessing of resources on the BDR and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The BDR Database

The BDR database component 919 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the BDR database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the BDR database is implemented as a data-structure, the use of the BDR database 919 may be integrated into another component such as the BDR component 935. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 919 includes several tables 919*a*-*j*. A Users table 919*a* may include fields such as, but not limited to: user_id, ssn, dob, first_name, last_name, age, state, address_firstline, address_secondline, zipcode, devices_list, contact_info, contact_type, alt_contact_info, alt_contact_type, and/or the like. The Users table may support and/or track multiple entity accounts on a BDR. A Clients table 919*b* may include fields such as, but not limited to: client_id, client_name, client_ip, client_type, client_model, operating_system, os_version, app_installed_flag, and/or the like. A Machines table may support and/or track multiple entity accounts on a BDR. A Machines table 919*c* may include fields such as, but not limited to: machine_id, machine_type, machine_index and/or the like. A Dataset table 919*d* may include fields such as, but not limited to: ds_id, ds_origin, ds_type, ds_name and/or the like. A Vectors table 919*e* may include fields such as, but not limited to: vec_id, vec_primaryMachine, vec_secondaryMachine, vec_dataset and/or the like. A Snapshots table 919*f* may include fields such as, but not limited to: snp_machine, snp_dataset, snp_timeStamp, and/or the like. An Incrementals table 919*g* may include fields such as, but not limited to: inc_machine, inc_dataset, inc_timeStamp0, inc_timeStamp1, inc_path, and/or the like. A Targets table 919*h* may include fields such as, but not limited to: tgt_deviceID, tgt_primaryServerID, tgt_secondaryServerID, and/or the like. A SSHkeys table 919*i* may include fields such as, but not limited to: ssh_machine, ssh_address, ssh_key, and/or the like. An Actions table 919*j* may include fields such as, but not limited to: act_id, act_action, act_machine, act_dataset, act_timeStamp0, act_timeStamp1, act_state, act_pid, and/or the like.

In one embodiment, the BDR database may interact with other database systems. For example, employing a distributed database system, queries and data access by search BDR component may treat the combination of the BDR database, an integrated data security layer database as a single database entity.

In one embodiment, user programs may contain various user interface primitives, which may serve to update the BDR. Also, various accounts may require custom database tables depending upon the environments and the types of clients the BDR may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 919*a-j*. The BDR may be configured to keep track of various settings, inputs, and parameters via database controllers.

The BDR database may communicate to and/or with other components in a component collection, including itself, and/or facilities of the like. Most frequently, the BDR database communicates with the BDR component, other program components, and/or the like. The database may contain, retain, and provide information regarding other nodes and data.

The BDRs

The BDR component 935 is a stored program component that is executed by a CPU. In one embodiment, the BDR component incorporates any and/or all combinations of the aspects of the BDR that was discussed in the previous figures. As such, the BDR affects accessing, obtaining and the provision of information, services, transactions, and/or the like across various communications networks. The features and embodiments of the BDR discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the BDR's features and facilities, and in many cases reduce the costs, energy consumption/requirements, and extend the life of BDR's underlying infrastructure; this has the added benefit of making the BDR more reliable. Similarly, many of the features and mechanisms are designed to be easier for users to use and access, thereby broadening the audience that may enjoy/employ and exploit the feature sets of the BDR; such ease of use also helps to increase the reliability of the BDR. In addition, the feature sets include heightened security as noted via the Cryptographic components 920, 926, 928 and throughout, making access to the features and data more reliable and secure.

The BDR component may transform machine datasets into replications and redundant ready-to-use backup files, and/or the like and use the BDR. In one embodiment, the BDR component 935 takes inputs (e.g., configure backup agent 204, periodic backup server 208, task processing assistance request 214, assisting node processing request 218, and port forwarding for file transfer session 222, and/or the like) etc., and transforms the inputs via various components (e.g., PAE Component 941, CIH Component 942, VRG Component 943, RP Component 944; kernel tracing component 955; and/or the like), into outputs (e.g., periodic server backup response, task processing assistance response, assisting node processing response, backup response, task processing assistance response, assisting node processing response, port forwarding for file transfer session response, and/or the like).

The BDR component enabling access of information between nodes may be developed by employing standard development tools and languages such as, but not limited to: Apache components, Assembly, ActiveX, binary executables, (ANSI) (Objective-) C (++), C # and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the BDR server employs a cryptographic server to encrypt and decrypt communications. The BDR component may communicate to and/or with other components in a component collection, including itself, and/or facilities of the like. Most frequently, the BDR component communicates with the BDR database, operating systems, other program components, and/or the like. The BDR may contain, communicate, generate, obtain, and/or provide program component, system, user, and/or data communications, requests, and/or responses.

Distributed BDRs

The structure and/or operation of any of the BDR node controller components may be combined, consolidated, and/ or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the BDR controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.: w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the BDR controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is described in U.S. Pat. No. 9,594,636, by Mortensen et al., issued Mar. 14, 2017 and entitled "MANAGEMENT OF DATA REPLICATION AND STORAGE APPARATUSES, METHODS AND SYSTEMS".

Disclosed herein are exemplary embodiments including, but not limited to, the following:

[A1] A processor implemented method for tracing a kernel call of interest associated with an operating system platform of a device, the method comprising: determining a memory location of a kernel system call table within a kernel memory space of the device, the kernel system call table including a plurality of kernel call entries, each kernel call entry including a pointer to a memory address of an opcode and associated operand within the kernel memory space; determining a memory location of a kernel call of interest entry within the memory location of the kernel system call table, and extracting a pointer associated with the kernel call of interest entry within the memory location of the kernel system call table; performing a disassembler search process to validate the kernel call of interest entry points to an opcode and associated operand which transfers control of execution of the kernel call of interest to a memory address identical to a target memory address associated with the kernel call of interest included in a kernel system call map table, the kernel system call map including a plurality of kernel calls mapped to a plurality of respective target memory addresses within the kernel memory space, and the disassembler search process setting a kernel call entry condition as valid if the kernel call of interest entry points to an opcode and associated operand which transfers control of execution of the kernel call of interest to the target memory address associated with the kernel call of interest included in the kernel system call map table.

[A2] The method for tracing a kernel call of interest according to paragraph [A1], wherein the operating system platform is a Linux operating system platform.

[A3] The method for tracing a kernel call of interest according to paragraph [A1], wherein the device is one of a PC, workstation, server, mobile computing device, cell phone, web appliance, network router, switch, bridge, tablet PC, set-top box (STB), and personal digital assistant (PDA).

[A4] The method for tracing a kernel call of interest according to paragraph [A1], wherein the disassembler search process is iteratively performed on a plurality of sequential opcodes and operands associated with the kernel call of interest until the kernel call entry condition is set to valid or a next sequential opcode is determined to be associated with a Return instruction.

[A5] The method for tracing a kernel call of interest according to paragraph [A1], further comprising: a kernel module operatively associated with the operating system platform configured to perform the method, and the kernel module configured to direct the execution of the kernel call of interest using a modified kernel system call table operatively associated with the operating system platform of the device, the modified kernel system call table including a pointer which redirects the kernel call of interest, prior to execution by the operating system platform, to the kernel module, and the kernel module subsequently directing the execution of the kernel call of interest by the operating system platform by calling a memory address associated with an original kernel system call table entry associated with the kernel call of interest, wherein the modified kernel system call table is generated by a kernel module function modifying the original kernel system call table if a kernel call verification process sets the kernel call entry condition as valid, the kernel call verification process including the disassembler search process.

[A6] The method for tracing a kernel call of interest according to paragraph [A1], wherein the kernel call of interest is associated with a file system logical volume attachment command.

[A7] The method for tracing a kernel call of interest according to paragraph [A1], wherein the kernel call of interest is one of a mount kernel call and unmount kernel call.

[A8] The method for tracing a kernel call of interest according to paragraph [A7], wherein the method is performed by a kernel module operatively associated with a backup agent configured to perform a backup of a memory operatively associated with the device during an execution of one of a mount kernel call and an unmount kernel call associated with the operating system platform of the device.

[A9] The method for tracing a kernel call of interest according to paragraph [A8], further comprising: the kernel module operatively associated with the operating system platform and configured to direct the execution of the kernel call of interest using a modified kernel system call table operatively associated with the operating system platform of the device, the modified kernel system call table including a pointer which redirects the kernel call of interest, prior to execution by the operating system platform, to the kernel module, and the kernel module subsequently directing the execution of the kernel call of interest by the operating system platform by calling a memory address associated with an original kernel system call table entry associated with the kernel call of interest, wherein the modified kernel system call table is generated by a kernel module function modifying the original kernel system call table if a kernel call verification process sets the kernel call entry condition as valid, the kernel call verification process including the disassembler search process.

[A10] The method for tracing a kernel call of interest according to paragraph [A8], wherein the backup of a memory includes one of an incremental backup, a full backup and a differential backup.

[A11] A processor implemented method for creating a backup of a memory operatively associated with a device during an execution of a kernel call of interest associated with an operating system platform of the device, the kernel call of interest including one of a mount kernel call and an unmount kernel call, the device including a backup agent operatively associated with the operating system platform, and the backup agent operatively associated with a backup system to store backups of the memory operatively associated with the device during the execution of the kernel call of interest, the method comprising: a modified kernel system call table including a pointer which redirects the kernel call of interest, prior to execution by the operating system platform, to the backup agent to perform the backup of the memory during execution of the kernel call of interest; and a kernel module executing the kernel call of interest by the operating system platform by calling a memory address associated with an original kernel system call table entry associated with the kernel call of interest, wherein the modified kernel system call table is generated by a kernel module function modifying the original kernel system call table if a kernel call verification process sets a kernel call entry condition as valid, the kernel call verification process including a disassembler search process configured to validate the original kernel system call table entry associated with the kernel call of interest points to an opcode and associated operand which transfers control of execution of the kernel call of interest to a memory address identical to a target memory address associated with the kernel call of interest included in a kernel system call map table, the kernel system call map including a plurality of kernel calls mapped to a plurality of respective target memory addresses within the kernel memory space, and the disassembler search process setting the kernel call entry condition as valid if the kernel call of interest entry points to an opcode and associated operand which transfers control of execution of the kernel call of interest to the target memory address associated with the kernel call of interest included in the kernel system call map table.

[A12] The method for creating a backup of a memory according to paragraph [A11], wherein the operating system platform is a Linux operating system platform.

[A13] The method for creating a backup of a memory according to paragraph [A11], wherein the device is one of a PC, workstation, server, mobile computing device, cell phone, web appliance, network router, switch, bridge, tablet PC, set-top box (STB), and personal digital assistant (PDA).

[A14] The method for creating a backup of a memory according to paragraph [A11], wherein the disassembler search process is iteratively performed on a plurality of sequential opcodes and operands associated with the kernel call of interest until the kernel call entry condition is set to valid or a next sequential opcode is determined to be associated with a Return instruction.

[A15] The method for creating a backup of a memory according to paragraph [A11], wherein the kernel module executes one or more copy-on-write commands during execution of the backup of the memory operatively associated with the device.

[A16] The method for creating a backup of a memory according to paragraph [A11], wherein the memory operatively associated with the device is one or more of a complete hard disk, partial hard disk volume, complete virtual disk, partial virtual disk volume, solid state storage device, magnetic tape storage, other nonvolatile and volatile data media, and one or more files located in the memory.

[A17] The method for creating a backup of a memory according to paragraph [A11], wherein the backup agent is a local backup agent operatively associated with a backup aggregator.

[A18] The method for creating a backup of a memory according to paragraph [A11], the modified kernel system call table generated by the kernel call verification process further comprising: disassembling the opcode and associated operand to determine if the opcode is a jump, call or branch; if the disassembled opcode is a jump, call or branch, determining if the operand associated with the opcode is associated with a memory address matching the target memory address of the kernel call of interest associated with the kernel system call map table; and if the memory address associated with the operand matches the target memory address of the kernel call of interest associated with the kernel system call map table, modifying the original kernel system call table to redirect the kernel call of interest, prior to execution by the operating system platform, to the kernel module.

[A19] The method for creating a backup of a memory according to paragraph [A18], the modified kernel system call table generated by the kernel call verification process further comprising: if the disassembled opcode and associated operand is associated with a memory address determined not to match the target memory address of the kernel call of interest associated with the kernel system call map table, disassembling a second opcode and determining if the second opcode is a jump, call or branch; if the disassembled second opcode is a jump, call or branch, determining if an operand associated with the second opcode is associated with a memory address matching the target memory address of the kernel call of interest associated with the kernel system call map table; and if the memory address associated with the operand associated with the second opcode matches the target memory address of the kernel call of interest associated with the kernel system call map table, modifying the kernel system call table to redirect the kernel call of interest, prior to execution by the operating system platform, to the kernel module.

[A20] The method for creating a backup of a memory according to paragraph [A19], wherein the disassembler search process is iteratively performed on a plurality of sequential opcodes and operands associated with the kernel call of interest until the kernel call entry condition is set to valid or a next sequential opcode is determined to be associated with a Return instruction.

[A21] A backup system for managing the replication and storage of data sets comprising: a memory storing computer executed instructions; and one or more processors operatively associated with the memory, the one or more processors configured to implement a host of a first file system, the one or more processors being further configured to execute the instructions to: execute a backup of a state and content of a computer device operatively associated with the memory and the one or more processors according to a backup and snapshot schedule, the backup generating image enabled backup data reflecting the state and content of the computer device, the backup capturing a snapshot of the image enabled backup date, and the backup storing the snapshot in the first file system; synchronize the first file system to a mirrored second file system; execute a kernel call of interest including one of a mount kernel call and an unmount kernel call prompted by a modified kernel system call table operatively associated with an operating system platform of the computer device, the modified kernel system call table including a pointer which redirects the kernel call of interest, prior to execution by the operating system platform; and a kernel module directing an execution of the kernel call of interest by the operating system platform by calling a memory address associated with an original kernel system call table entry associated with the kernel call of interest, wherein the modified kernel system call table is generated by a kernel module function modifying the original kernel system call table if a kernel call verification process sets a kernel call entry condition as valid, the kernel call verification process including a disassembler search process configured to validate the original kernel system call table entry associated with the kernel call of interest points to an opcode and associated operand which transfers control of execution of the kernel call of interest to a memory address identical to a target memory address associated with the kernel call of interest included in a kernel system call map table, the kernel system call map including a plurality of kernel calls mapped to a plurality of respective target memory addresses within the kernel memory space, and the disassembler search process setting the kernel call entry condition as valid if the kernel call of interest entry points to an opcode and associated operand which transfers control of execution of the kernel call of interest to the target memory address associated with the kernel call of interest included in the kernel system call map table.

[A22] The backup system for managing the replication and storage of data sets according to paragraph [A21], wherein the operating system platform is a Linux operating system platform.

[A23] The backup system for managing the replication and storage of data sets according to paragraph [A21], wherein the device is one of a PC, workstation, server, mobile computing device, cell phone, web appliance, network router, switch, bridge, tablet PC, set-top box (STB), and personal digital assistant (PDA).

[A24] The backup system for managing the replication and storage of data sets according to paragraph [A21], wherein the disassembler search process is iteratively performed on a plurality of sequential opcodes and operands associated with the kernel call of interest until the kernel call entry condition is set to valid.

[A25] The backup system for managing the replication and storage of data sets according to paragraph [A21], wherein the kernel module executes one or more copy-on-write commands during execution of the backup of the memory operatively associated with the device.

[A26] The backup system for managing the replication and storage of data sets according to paragraph [A21], wherein the memory operatively associated with the device is one or more of a complete hard disk, partial hard disk volume, complete virtual disk, partial virtual disk volume, solid state storage device, magnetic tape storage, other nonvolatile and volatile data media, and one or more files located in the memory.

[A27] The backup system for managing the replication and storage of data sets according to paragraph [A21], wherein the backup agent is a local backup agent operatively associated with a backup aggregator.

[A28] The backup system for managing the replication and storage of data sets according to paragraph [A21], the modified kernel system call table generated by the kernel call verification process further comprising: disassembling the opcode and associated operand to determine if the opcode is a jump, call or branch; if the disassembled opcode is a jump, call or branch, determining if an operand associated with the opcode is associated with a memory address matching the target memory address of the kernel call of interest associated with the kernel system call map table; and if the memory address associated with the operand matches the target memory address of the kernel call of interest associated with the kernel system call map table, modifying the original kernel system call table to redirect the kernel call of interest, prior to execution by the operating system platform, to the kernel module.

[A29] The backup system for managing the replication and storage of data sets according to paragraph [A28], the modified kernel system call table generated by the kernel call verification process further comprising: if the disassembled opcode and associated operand is determined not to be a jump, call or branch, disassembling a second opcode and associated operand to determine if the second opcode is a jump, call or branch; if the disassembled second opcode is a jump, call or branch, determining if an operand associated with the second opcode is associated with a memory address matching the target memory address of the kernel call of interest associated with the kernel system call map table; and if the memory address associated with the operand associated with second opcode matches the target memory address of the kernel call of interest associated with the kernel system call map table, modifying the original kernel system call table to redirect the kernel call of interest, prior to execution by the operating system platform, to the kernel module.

[A30] The backup system for managing the replication and storage of data sets according to paragraph [A29], wherein the second opcode is a next sequentially located opcode relative to a memory location pointed to by the original kernel system call table entry associated with the kernel call of interest.

[A31] A backup agent for persisting an incremental backup of a memory operatively associated with a device during an execution of a kernel call of interest including one of a mount kernel call and an unmount kernel call associated with an operating system platform of the device, the backup agent configured to perform an incremental backup method comprising: determining a memory location of an original kernel system call table within a kernel memory space of the device, the original kernel system call table including a plurality of kernel call entries, each kernel call entry including a pointer to memory address of an opcode and associated operand within the kernel memory space; determining a memory location of the kernel call of interest within the memory location of the original kernel system call table, and extracting a pointer associated with the kernel call of interest entry within the memory location of the original kernel system call table; performing a disassembler search process to validate the kernel call of interest entry points to an opcode and associated operand which transfers control of execution of the kernel call of interest to a memory address identical to a target memory address associated with the kernel call of interest included in a kernel system call map table, the kernel system call map including a plurality of kernel calls mapped to a plurality of respective target memory addresses within the kernel memory space, the disassembler search process setting a kernel call entry condition as valid if the kernel call of interest entry points to an opcode and associated operand which transfers control of execution of the kernel call of interest to the target memory address associated with the kernel call of interest included in the kernel system call map table, a modified kernel system call table operatively associated with the operating system platform of the device directing the execution of the kernel call of interest, the modified kernel system call table redirecting the kernel call of interest, prior to execution by the operating system platform, to a kernel module; and the kernel module directing the execution of the kernel call of interest by the operating system platform by calling a memory address associated with an original kernel system call table entry associated with the kernel call of interest, wherein the modified kernel system call table is generated by a kernel module function modifying the original kernel system call table if a kernel call verification process, including the disassembler search process, sets the kernel call entry condition as valid.

[A32] The backup agent for persisting an incremental backup of a memory according to paragraph [A31], wherein the operating system platform is a Linux operating system platform.

[A33] The backup agent for persisting an incremental backup of a memory according to paragraph [A31], wherein the device is one of a PC, workstation, server, mobile computing device, cell phone, web appliance, network router, switch, bridge, tablet PC, set-top box (STB), and personal digital assistant (PDA).

[A34] The backup agent for persisting an incremental backup of a memory according to paragraph [A31], wherein the disassembler search process is iteratively performed on a plurality of sequential opcodes and operands associated with the kernel call of interest until the kernel call entry condition is set to valid.

[A35] The backup agent for persisting an incremental backup of a memory according to paragraph [A31], wherein the kernel module executes one or more copy-on-write commands during execution of the incremental backup of the memory operatively associated with the device.

[A36] The backup agent for persisting an incremental backup of a memory according to paragraph [A31], wherein the memory operatively associated with the device is one or more of a complete hard disk, partial hard disk volume, complete virtual disk, partial virtual disk volume, solid state storage device, magnetic tape storage, other nonvolatile and volatile data media, and one or more files located in the memory.

[A37] The backup agent for persisting an incremental backup of a memory according to paragraph [A31], wherein the backup agent is a local backup agent operatively associated with a back-up aggregator.

[A38] The backup agent for persisting an incremental backup of a memory according to paragraph [A31], the modified kernel system call table generated by the kernel call verification process further comprising: disassembling the opcode and associated operand to determine if the opcode is a jump, call or branch; if the disassembled opcode is a jump, call or branch, determining if an operand associated with the opcode is associated with a memory address matching the target memory address of the kernel call of interest associated with the kernel system call map table; and if the memory address associated with the operand matches the target memory address of the kernel call of interest associated with the kernel system call map table, modifying the original kernel system call table to redirect the kernel call of interest, prior to execution by the operating system platform, to the kernel module.

[A39] The backup agent for persisting an incremental backup of a memory according to paragraph [A38], the modified kernel system call table generated by the kernel call verification process further comprising: if the disassembled opcode and associated operand is determined not to be a jump, call or branch, disassembling a second opcode and associated operand to determine if the second opcode is a jump, call or branch; if the disassembled second opcode is a jump, call or branch, determining if an operand associated with the second opcode is associated with a memory address matching the target memory address of the kernel call of interest associated with the kernel system call map table; and if the memory address associated with the operand associated with second opcode matches the target memory address of the kernel call of interest associated with the kernel system call map table, modifying the original kernel system call table to redirect the kernel call of interest, prior to execution by the operating system platform, to the kernel module.

[A40] The backup agent for persisting an incremental backup of a memory according to paragraph [A39] wherein the second opcode is a next sequentially located opcode relative to a memory location pointed to by the original kernel system call table entry associated with the kernel call of interest.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A processor implemented method for tracing a kernel call of interest associated with an operating system platform of a device, the method comprising:
determining a memory location of a kernel system call table within a kernel memory space of the device, the kernel system call table including a plurality of kernel call entries, each kernel call entry including a pointer to a memory address of an opcode and associated operand within the kernel memory space;
determining a memory location of a kernel call of interest entry within the memory location of the kernel system call table, and extracting a pointer associated with the kernel call of interest entry within the memory location of the kernel system call table;

performing a disassembler search process to validate the kernel call of interest entry points to an opcode and associated operand which transfers control of execution of the kernel call of interest to a memory address identical to a target memory address associated with the kernel call of interest included in a kernel system call map table, the kernel system call map including a plurality of kernel calls mapped to a plurality of respective target memory addresses within the kernel memory space, and the disassembler search process setting a kernel call entry condition as valid if the kernel call of interest entry points to an opcode and associated operand which transfers control of execution of the kernel call of interest to the target memory address associated with the kernel call of interest included in the kernel system call map table.

2. The method for tracing a kernel call of interest according to claim 1, wherein the operating system platform is a Linux operating system platform.

3. The method for tracing a kernel call of interest according to claim herein the device is one of a PC, workstation, server, mobile computing device, cell phone, web appliance, network router, switch, bridge, tablet PC, set-top box (STB), and personal digital assistant (PDA).

4. The method for tracing a kernel call of interest according to claim 1, wherein the disassembler search process is iteratively performed on a plurality of sequential opcodes and operands associated with the kernel call of interest until the kernel call entry condition is set to valid or a next sequential opcode is determined to be associated with a Return instruction.

5. The method fog tracing a kernel call of interest according to claim 1, further comprising:
a kernel module operatively associated with the operating system platform configured to perform the method, and the kernel module configured to direct the execution of the kernel call of interest using a modified kernel system call table operatively associated with the operating system platform of the device, the modified kernel system call table including a pointer which redirects the kernel call of interest, prior to execution by the operating system platform, to the kernel module, and the kernel module subsequently directing the execution of the kernel call of interest by the operating system platform by calling a memory address associated with an original kernel system call table entry associated with the kernel call of interest,
wherein the modified kernel system call table is generated by a kernel module function modifying the original kernel system call table if a kernel call verification process sets the kernel call entry condition as valid, the kernel call verification process including the disassembler search process.

6. The method for tracing a kernel call of interest according to claim 1, wherein the kernel call of interest is associated with a file system logical volume attachment command.

7. The method for tracing a kernel call of interest according to claim 1, wherein the kernel call of interest is one of a mount kernel call and unmount kernel call.

8. The method for tracing a kernel call of interest according to claim 7, wherein the method is performed by a kernel module operatively associated with a backup agent configured to perform a backup of a memory operatively associated with the device during an execution of one of a mount kernel call and an unmount kernel call associated with the operating system platform of the device.

9. The method for tracing a kernel call of interest according to claim 8, further comprising:
the kernel module operatively associated with the operating system platform and configured to direct the execution of the kernel call of interest using a modified kernel system call table operatively associated with the operating system platform of the device, the modified kernel system call table including a pointer which redirects the kernel call of interest, prior to execution by the operating system platform, to the kernel module, and the kernel module subsequently directing the execution of the kernel call of interest by the operating system platform by calling a memory address associated with an original kernel system call table entry associated with the kernel call of interest,
wherein the modified kernel system call table is generated by a kernel module function modifying the original kernel system call table if a kernel call verification process sets the kernel call entry condition as valid, the kernel call verification process including the disassembler search process.

10. The method for tracing a kernel call of interest according to claim 8, wherein the backup of a memory includes one of an incremental backup, a full backup and a differential backup.

11. A processor implemented method for creating a backup of a memory operatively associated with a device during an execution of a kernel call of interest associated with an operating system platform of the device, the kernel call of interest including one of a mount kernel call and an unmount kernel call, the device including a backup agent operatively associated with the operating system platform, and the backup agent operatively associated with a backup system to store backups of the memory operatively associated with the device during the execution of the kernel call of interest, the method comprising:
a modified kernel system call table including a pointer which redirects the kernel call of interest, prior to execution by the operating system platform, to the backup agent to perform the backup of the memory during execution of the kernel call of interest; and
a kernel module executing the kernel call of interest by the operating system platform by calling a memory address associated with an original kernel system call table entry associated with the kernel call of interest,
wherein the modified kernel system call table is generated by a kernel module function modifying the original kernel system call table if a kernel call verification process sets a kernel call entry condition as valid, the kernel call verification process including a disassembler search process configured to validate the original kernel system call table entry associated with the kernel call of interest points to an opcode and associated operand which transfers control of execution of the kernel call of interest to a memory address identical to a target memory address associated with the kernel call of interest included in a kernel system call map table, the kernel system call map including a plurality of kernel calls mapped to a plurality of respective target memory addresses within the kernel memory space, and the disassembler search process setting the kernel call entry condition as valid if the kernel call of interest entry points to an opcode and associated operand which transfers control of execution of the kernel call of interest to the target memory address associated with the kernel call of interest included in the kernel system call map table.

12. The method for creating a backup of a memory according to claim 11, wherein the operating system platform is a Linux operating system platform.

13. The method for creating a backup of a memory according to claim 11, wherein the device is one of a PC, workstation, server, mobile computing device, cell phone, web appliance, network router, switch, bridge, tablet PC, set-top box (STB), and personal digital assistant (PDA).

14. The method for creating a backup of a memory according to claim 11, wherein the disassembler search process is iteratively performed on a plurality of sequential opcodes and operands associated with the kernel call of interest until the kernel call entry condition is set to valid or a next sequential opcode is determined to be associated with a Return instruction.

15. The method for creating a backup of a memory according to claim 11, wherein the kernel module executes one or more copy-on-write commands during execution of the backup of the memory operatively associated with the device.

16. The method for creating a backup of a memory according to claim 11, wherein the memory operatively associated with the device is one or more of a complete hard disk, partial hard disk volume, complete virtual disk, partial virtual disk volume, solid state storage device, magnetic tape storage, other nonvolatile and volatile data media, and one or more files located in the memory.

17. The method for creating a backup of a memory according to claim 11, wherein the backup agent is a local backup agent operatively associated with a backup aggregator.

18. The method for creating a backup of a memory according to claim 11, the modified kernel system call table generated by the kernel call verification process further comprising:
   disassembling the opcode and associated operand to determine if the opcode is a jump, call or branch;
   if the disassembled opcode is a jump, call or branch, determining if the operand associated with the opcode is associated with a memory address matching the target memory address of the kernel call of interest associated with the kernel system call map table; and
   if the memory address associated with the operand matches the target memory address of the kernel call of interest associated with the kernel system call map table, modifying the original kernel system call table to redirect the kernel call of interest, prior to execution by the operating system platform, to the kernel module.

19. The method for creating a backup of a memory according to claim 18, the modified kernel system call table generated by the kernel call verification process further comprising:
   if the disassembled opcode and associated operand is associated with a memory address determined not to match the target memory address of the kernel call of interest associated with the kernel system call map table, disassembling a second opcode and determining if the second opcode is a jump, call or branch;
   if the disassembled second opcode is a jump, call or branch, determining if an operand associated with the second opcode is associated with a memory address matching the target memory address of the kernel call of interest associated with the kernel system call map table; and
   if the memory address associated with the operand associated with the second opcode matches the target memory address of the kernel call of interest associated with the kernel system call map table, modifying the kernel system call table to redirect the kernel call of interest, prior to execution by the operating system platform, to the kernel module.

20. The method for creating a backup of a memory according to claim 19, wherein the disassembler search process is iteratively performed on a plurality of sequential opcodes and operands associated with the kernel call of interest until the kernel call entry condition is set to valid or a next sequential opcode is determined to be associated with a Return instruction.

21. A backup system for managing the replication and storage of data sets comprising:
   a memory storing computer executed instructions; and
   one or more processors operatively associated with the memory, the one or more processors configured to implement a host of a first file system, the one or more processors being further configured to execute the instructions to:
   execute a backup of a state and content of a computer device operatively associated with the memory and the one or more processors according to a backup and snapshot schedule, the backup generating image enabled backup data reflecting the state and content of the computer device, the backup capturing a snapshot of the image enabled backup date, and the backup storing the snapshot in the first file system;
   synchronize the first file system to a mirrored second file system;
   execute a kernel call of interest including one of a mount kernel call and an unmount kernel call prompted by a modified kernel system call table operatively associated with an operating system platform of the computer device, the modified kernel system call table including a pointer which redirects the kernel call of interest, prior to execution by the operating system platform; and
   a kernel module directing an execution of the kernel call of interest by the operating system platform by calling a memory address associated with an original kernel system call table entry associated with the kernel call of interest,
   wherein the modified kernel system call table is generated by a kernel module function modifying the original kernel system call table if a kernel call verification process sets a kernel call entry condition as valid, the kernel call verification process including a disassembler search process configured to validate the original kernel system call table entry associated with the kernel call of interest points to an opcode and associated operand which transfers control of execution of the kernel call of interest to a memory address identical to a target memory address associated with the kernel call of interest included in a kernel system call map table, the kernel system call map including a plurality of kernel calls mapped to a plurality of respective target memory addresses within the kernel memory space, and the disassembler search process setting the kernel call entry condition as valid if the kernel call of interest entry points to an opcode and associated operand which transfers control of execution of the kernel call of interest to the target memory address associated with the kernel call of interest included in the kernel system call map table.

22. A backup agent for persisting an incremental backup of a memory operatively associated with a device during an execution of a kernel call of interest including one of a mount kernel call and an unmount kernel call associated with an operating system platform of the device, the backup agent including a non-transitory storage medium including instruction code executed by one or more processors to perform an incremental backup method comprising:
- determining a memory location of an original kernel system call table within a kernel memory space of the device, the original kernel system call table including a plurality of kernel call entries, each kernel call entry including a pointer to memory address of an opcode and associated operand within the kernel memory space;
- determining a memory location of the kernel call of interest within the memory location of the original kernel system call table, and extracting a pointer associated with the kernel call of interest entry within the memory location of the original kernel system call table;
- performing a disassembler search process to validate the kernel call of interest entry points to an opcode and associated operand which transfers control of execution of the kernel call of interest to a memory address identical to a target memory address associated with the kernel call of interest included in a kernel system call map table, the kernel system call map including a plurality of kernel calls mapped to a plurality of respective target memory addresses within the kernel memory space, and the disassembler search process setting a kernel call entry condition as valid if the kernel call of interest entry points to an opcode and associated operand which transfers control of execution of the kernel call of interest to the target memory address associated with the kernel call of interest included in the kernel system call map table
- a modified kernel system call table operatively associated with the operating system platform of the device directing the execution of the kernel call of interest, the modified kernel system call table redirecting the kernel call of interest, prior to execution by the operating system platform, to a kernel module; and
- the kernel module directing the execution of the kernel call of interest by the operating system platform by calling a memory address associated with an original kernel system call table entry associated with the kernel call of interest, wherein the modified kernel system call table is generated by a kernel module function modifying the original kernel system call table if a kernel call verification process, including the disassembler search process, sets the kernel call entry condition as valid.

* * * * *